United States Patent
Shah et al.

(10) Patent No.: US 11,868,384 B2
(45) Date of Patent: Jan. 9, 2024

(54) METHOD AND SYSTEM FOR AUTOMATICALLY DETERMINING RESPONSES IN A MESSAGING PLATFORM

(71) Applicant: OrangeDot, Inc., Santa Monica, CA (US)

(72) Inventors: Setu Shah, Santa Monica, CA (US); Watson Xi, Santa Monica, CA (US)

(73) Assignee: OrangeDot, Inc., Santa Monica, CA (US)

( * ) Notice: Subject to any disclaimer, the term of this patent is extended or adjusted under 35 U.S.C. 154(b) by 0 days.

(21) Appl. No.: 18/189,526

(22) Filed: Mar. 24, 2023

(65) Prior Publication Data
US 2023/0306049 A1 Sep. 28, 2023

Related U.S. Application Data

(60) Provisional application No. 63/323,707, filed on Mar. 25, 2022, provisional application No. 63/409,933, filed on Sep. 26, 2022.

(51) Int. Cl.
*G06F 16/338* (2019.01)

(52) U.S. Cl.
CPC .................. *G06F 16/338* (2019.01)

(58) Field of Classification Search
CPC ...................................... G06F 16/338
See application file for complete search history.

(56) References Cited

U.S. PATENT DOCUMENTS

| | | | |
|---|---|---|---|
| 4,845,323 A | 7/1989 | Beggs | |
| 6,356,940 B1 | 3/2002 | Short | |
| 6,827,670 B1 | 12/2004 | Stark et al. | |
| 7,188,151 B2 | 3/2007 | Kumar et al. | |
| 7,246,677 B2 | 7/2007 | Fredriksson et al. | |
| 7,248,677 B2 | 7/2007 | Randall et al. | |
| 7,337,158 B2 | 2/2008 | Fratkina et al. | |
| 7,376,700 B1 | 5/2008 | Clark et al. | |
| 7,584,166 B2 | 9/2009 | Grichnik | |
| 7,761,309 B2 | 7/2010 | Sacco et al. | |
| 7,818,185 B2 | 10/2010 | Bjorner et al. | |

(Continued)

FOREIGN PATENT DOCUMENTS

| | | |
|---|---|---|
| CN | 101600008 A | 12/2009 |
| JP | 2003339674 | 12/2003 |

(Continued)

OTHER PUBLICATIONS

Major Smith, Virginia, et al., "Work Time Interference With Family, and Psychological Distress", 2002, Journal of Applied Psychology, vol. 87, No. 3, 427-436 (Year: 2002)., Feb. 21, 2018 00:00:00.0.

(Continued)

*Primary Examiner* — Van H Oberly
(74) *Attorney, Agent, or Firm* — Jeffrey Schox; Caitlin Ploch

(57) ABSTRACT

In variants, a method for automatically determining responses in a messaging platform can include: receiving a set of inputs; determining a set of response options based on the set of inputs; and providing the set of response options to a user. The method can optionally further include training and/or updating a set of models, and/or updating a corpus of historical responses.

20 Claims, 12 Drawing Sheets

(56) References Cited

U.S. PATENT DOCUMENTS

| | | | |
|---|---|---|---|
| 8,160,901 B2 | 4/2012 | Heywood et al. | |
| 8,265,955 B2 | 9/2012 | Michelson et al. | |
| 8,398,538 B2 | 3/2013 | Dothie et al. | |
| 8,500,635 B2 | 8/2013 | Zilca et al. | |
| 8,684,922 B2 | 4/2014 | Tran | |
| 8,726,195 B2 | 5/2014 | Bill | |
| 9,286,442 B2 | 3/2016 | Csoma et al. | |
| 9,294,403 B2 | 3/2016 | Mejia et al. | |
| 9,684,922 B2 | 6/2017 | Elberbaum | |
| 11,100,179 B1 * | 8/2021 | Zhou | G06V 10/764 |
| 11,386,890 B1 | 7/2022 | Fan et al. | |
| 11,409,752 B1 | 8/2022 | Qadrud-Din et al. | |
| 11,556,843 B2 | 1/2023 | Backas et al. | |
| 2002/0198473 A1 | 12/2002 | Kumar et al. | |
| 2003/0119794 A1 | 6/2003 | Bacaner et al. | |
| 2004/0078223 A1 | 4/2004 | Sacco et al. | |
| 2004/0225340 A1 | 11/2004 | Evans | |
| 2005/0020903 A1 | 1/2005 | Krishnan et al. | |
| 2005/0055321 A1 | 3/2005 | Fratkina et al. | |
| 2005/0108051 A1 | 5/2005 | Weinstein | |
| 2005/0169446 A1 | 8/2005 | Randall et al. | |
| 2006/0064037 A1 | 3/2006 | Shalon et al. | |
| 2007/0094048 A1 | 4/2007 | Grichnik | |
| 2007/0226012 A1 | 9/2007 | Salgado et al. | |
| 2007/0288266 A1 | 12/2007 | Sysko et al. | |
| 2008/0059570 A1 | 3/2008 | Bill | |
| 2009/0125333 A1 | 5/2009 | Heywood et al. | |
| 2010/0082367 A1 | 4/2010 | Hains et al. | |
| 2010/0179833 A1 | 7/2010 | Roizen et al. | |
| 2010/0203876 A1 | 8/2010 | Krishnaswamy | |
| 2010/0280838 A1 | 11/2010 | Bosworth et al. | |
| 2011/0009715 A1 | 1/2011 | O et al. | |
| 2011/0066036 A1 | 3/2011 | Zilca et al. | |
| 2011/0118555 A1 | 5/2011 | Dhumne et al. | |
| 2011/0119212 A1 | 5/2011 | De et al. | |
| 2011/0184250 A1 | 7/2011 | Schmidt et al. | |
| 2012/0053425 A1 | 3/2012 | Michelson et al. | |
| 2012/0143013 A1 | 6/2012 | Davis et al. | |
| 2012/0221357 A1 | 8/2012 | Krause et al. | |
| 2012/0289791 A1 | 11/2012 | Jain et al. | |
| 2013/0004129 A1 | 1/2013 | Zhang | |
| 2013/0041290 A1 | 2/2013 | Kording et al. | |
| 2013/0042116 A1 | 2/2013 | Sakumoto | |
| 2013/0085758 A1 | 4/2013 | Csoma et al. | |
| 2013/0095459 A1 | 4/2013 | Tran | |
| 2013/0117040 A1 | 5/2013 | James et al. | |
| 2013/0154838 A1 | 6/2013 | Alameh et al. | |
| 2013/0179178 A1 | 7/2013 | Vemireddy et al. | |
| 2013/0246330 A1 | 9/2013 | Son et al. | |
| 2013/0297536 A1 | 11/2013 | Almosni et al. | |
| 2014/0039914 A1 | 2/2014 | Dansereau et al. | |
| 2016/0317781 A1 | 11/2016 | Proud | |
| 2019/0349321 A1 | 11/2019 | Cai et al. | |
| 2020/0097814 A1 * | 3/2020 | Devesa | G10L 15/1815 |
| 2020/0151254 A1 | 5/2020 | Wohlwend | |
| 2020/0211709 A1 | 7/2020 | Devesa | |
| 2020/0285705 A1 | 9/2020 | Zheng et al. | |
| 2020/0356627 A1 | 11/2020 | Pablo et al. | |
| 2021/0019648 A1 | 1/2021 | Backas et al. | |
| 2021/0117623 A1 | 4/2021 | Aly et al. | |
| 2021/0173874 A1 * | 6/2021 | Giddings | G06N 20/00 |
| 2022/0156298 A1 * | 5/2022 | Mahmoud | G06F 16/9535 |
| 2023/0096118 A1 | 3/2023 | Ramsl | |

FOREIGN PATENT DOCUMENTS

| | | |
|---|---|---|
| JP | 2010514497 A | 5/2010 |
| WO | 2008085308 A1 | 7/2008 |
| WO | 2008096634 A1 | 8/2008 |
| WO | 2012025622 A2 | 3/2012 |
| WO | 2013042116 A1 | 3/2013 |
| WO | 2015003247 A1 | 1/2015 |

OTHER PUBLICATIONS

Thomee, Sara, et al., "Mobile phone use and stress, sleep disturbances, and symptoms of depression among young adults—a prospective short study", BMC Public Health, Biomed Central, London, GB, vol. 11, No. 1, Jan. 31, 2011, p. 66.

Yen, Cheng-Fang, et al., "Symptoms of problematic cellular phone use, functional impairment and its association with depression among adolescents in Southern Taiwan", Journal of Adolescence, Academic Press, Amsterdam, NL, vol. 32, No. 4, Aug. 1, 2009, pp. 863-873.

* cited by examiner

METHOD AND SYSTEM FOR AUTOMATICALLY DETERMINING RESPONSES IN A MESSAGING PLATFORM

CROSS REFERENCE TO RELATED APPLICATIONS

This application claims the benefit of U.S. Provisional Application No. 63/323,707 filed 25 Mar. 2022 and U.S. Provisional Application No. 63/409,933 filed 26 Sep. 2022, each of which is incorporated in its entirety by this reference.

TECHNICAL FIELD

This invention relates generally to the remote communication field, and more specifically to a new and useful system and method for automatically determining responses in a messaging platform in the remote communication field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
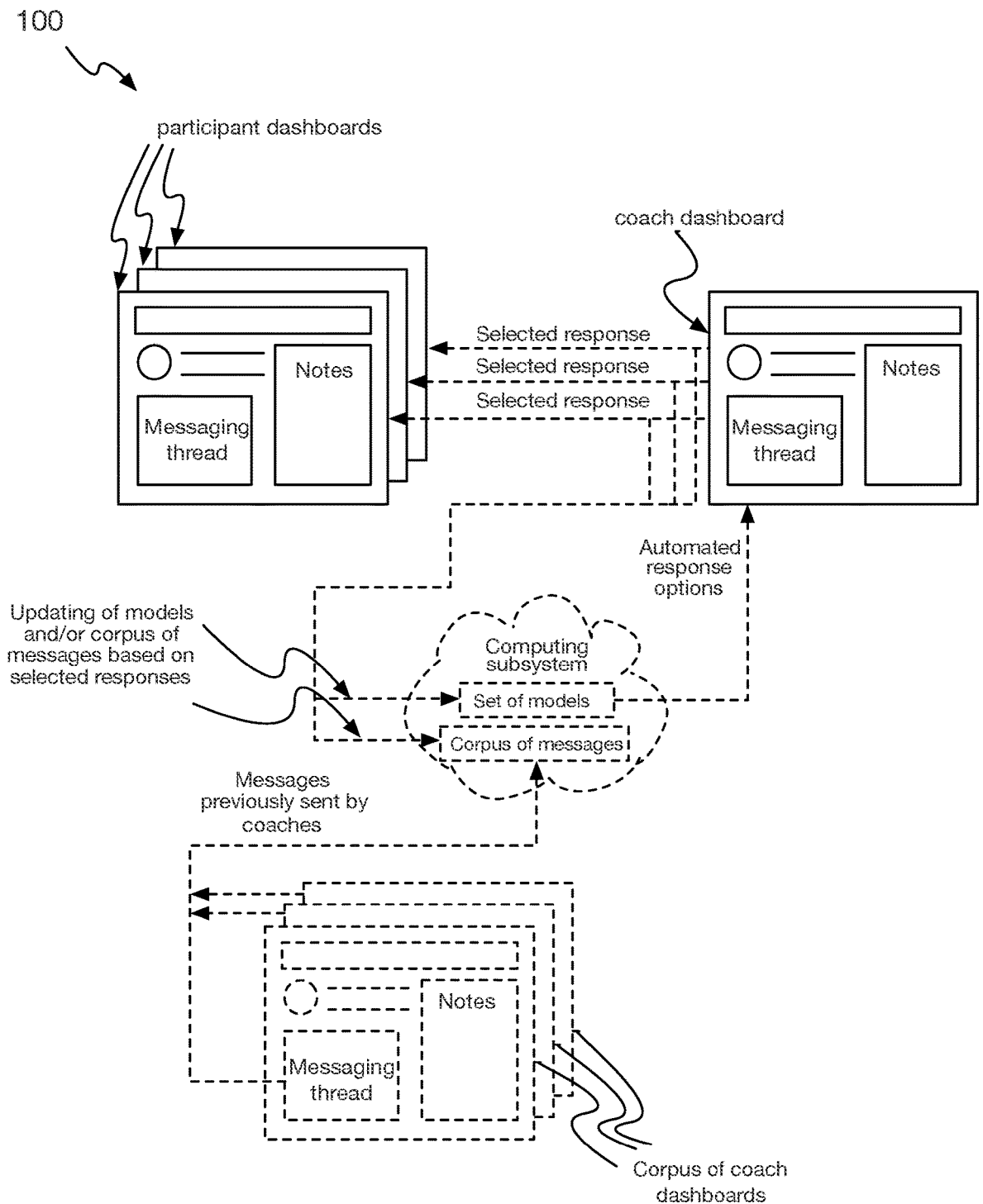
FIG. 1 is a schematic of a system for automatically determining responses in a messaging platform.

As shown in FIG. 1, a system 100 for automatically determining responses in a messaging platform can include and/or interface with any or all of: a set of models, a set of processing and/or computing subsystems, and a set of messaging platforms and/or messaging interfaces. Additionally or alternatively, the system can include any other suitable components. Further additionally or alternatively, the system 100 can include and/or interface with any or all of the systems, components, embodiments, and/or examples described in any or all of: U.S. application Ser. No. 13/969,349, filed 16 Aug. 2013; U.S. application Ser. No. 14/839,053, filed 28 Aug. 2015; U.S. application Ser. No. 14/839,232, filed 28 Aug. 2015; U.S. application Ser. No. 15/005,923, filed 25 Jan. 2016; U.S. application Ser. No. 15/069,163, filed 14 Mar. 2016; U.S. application Ser. No. 15/265,454, filed 14 Sep. 2016; and U.S. application Ser. No. 15/482,995, filed 10 Apr. 2017; each of which is incorporated herein in its entirety by this reference.

Figure 2:
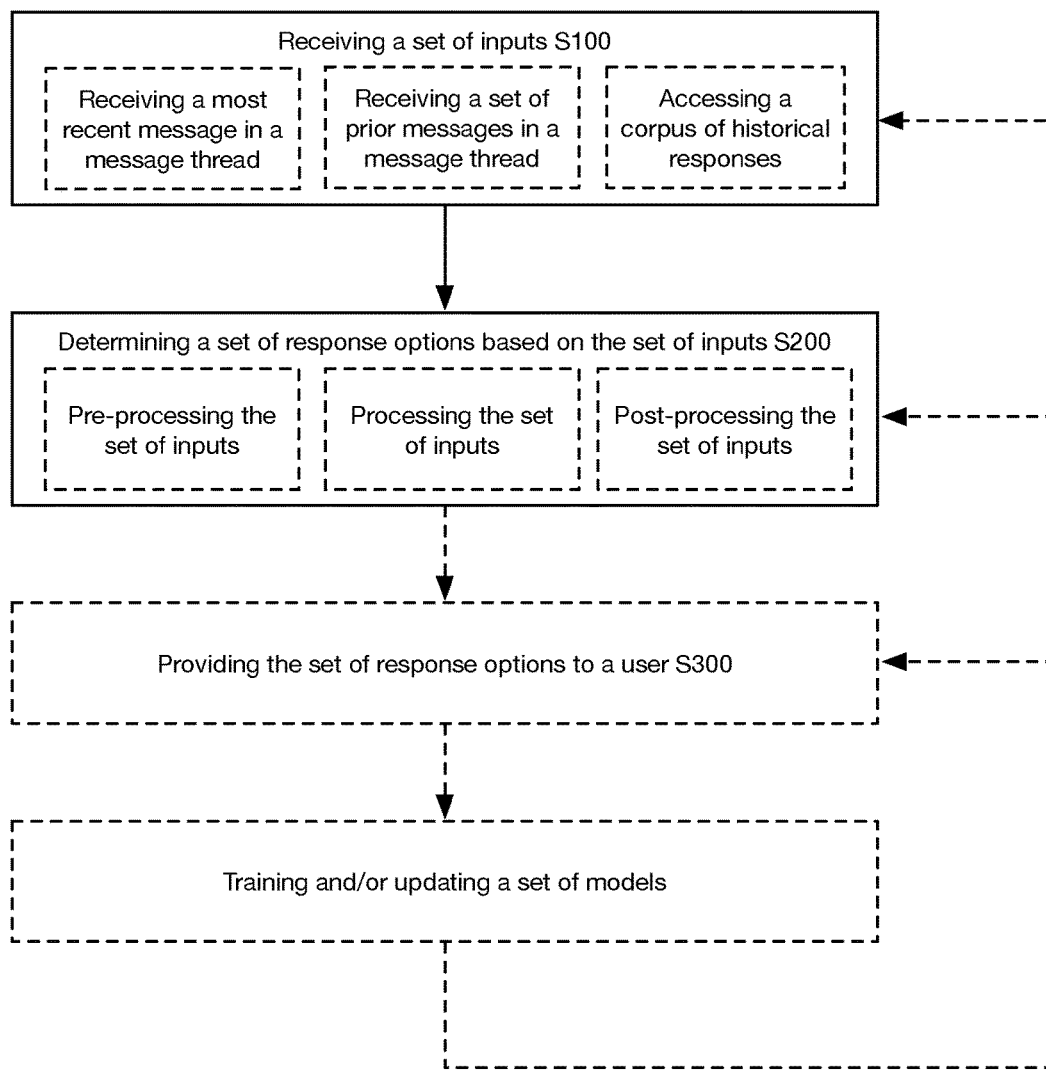
FIG. 2 is a schematic of a method for automatically determining responses in a messaging platform.

As shown in FIG. 2, in variants, a method 200 for automatically determining responses in a messaging platform includes any or all of: receiving a set of inputs S100; determining a set of response options based on the set of inputs S200; and providing the set of response options to a user S300. Additionally or alternatively, the method 200 can include training and/or updating a set of models, and/or any or all of the processes described in any or all of: U.S. application Ser. No. 13/969,349, filed 16 Aug. 2013; U.S. application Ser. No. 14/839,053, filed 28 Aug. 2015; U.S. application Ser. No. 14/839,232, filed 28 Aug. 2015; U.S. application Ser. No. 15/005,923, filed 25 Jan. 2016; U.S. application Ser. No. 15/069,163, filed 14 Mar. 2016; U.S. application Ser. No. 15/265,454, filed 14 Sep. 2016; and U.S. application Ser. No. 15/482,995, filed 10 Apr. 2017; each of which is incorporated herein in its entirety by this reference, or any other suitable processes performed in any suitable order.

Figure 7:
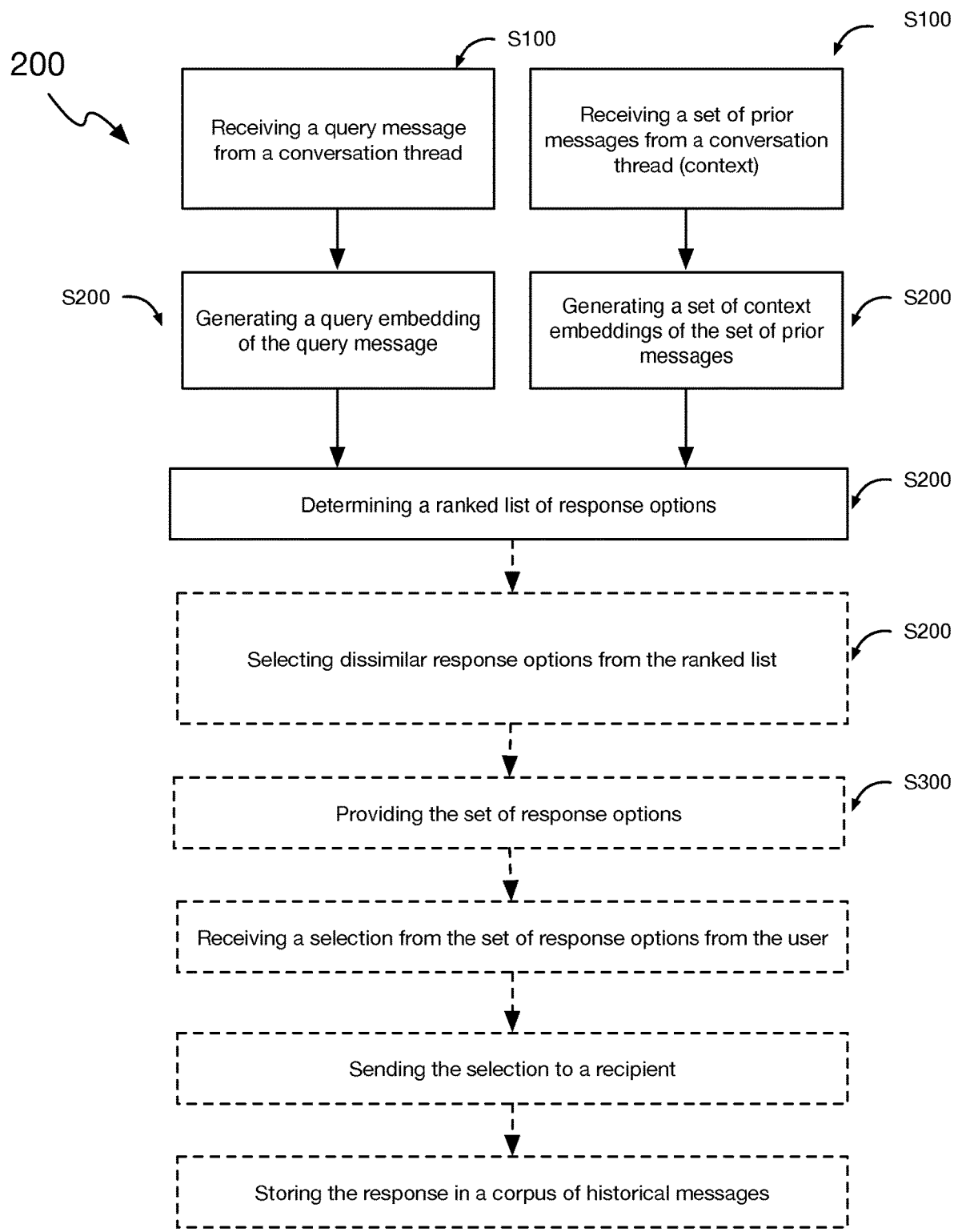
FIG. 7 depicts an example of any or all of a method for automatically determining responses in a messaging platform.

In an illustrative example (example shown in FIG. 7), the method 200 can include: determining a query message (e.g., from a recipient) and a set of prior messages from a conversation thread S100; generating a query embedding of the query message and a set of context embeddings of the set of prior messages S200; determining a candidate set of response options (e.g., a ranked list of response options, a ranked list of historical responses, etc.) based on the query embedding and the set of content embeddings using a model (e.g., a trained smart reply model) S200; determining a presented set of response options from the candidate set of response options, wherein each response option in the presented set of response options differs from the other members of the set by at least a threshold amount; providing the presented set of response options to a user; receiving a response selection from the presented set of response options from the user; sending the selected response to a recipient; and optionally storing the response in a corpus of historical messages for future auto-response generation. In variants, the candidate set of response options can optionally be determined based on embeddings of each response option, and/or the presented set of response options can be selected based on the respective response option embedding. In variants, the query embeddings, the context embeddings and the response option embeddings can be in the same (e.g., common) or different embedding space (e.g., latent space), and be generated by the same or different embedding model. In variants, the smart reply model can predict: a ranked list, a probability for each of the set of response options, a ranking for each response option of the set, and/or otherwise determine the ranked list.

In another illustrative example, a response recommendation system can include: a corpus of response options; one or more conversation threads including a query (e.g., the last message) and a set of context (e.g., messages within a message window preceding the query); an embedding model configured to embed messages (e.g., responses, queries, context messages, etc.) into a common embedding space (e.g., latent space); a smart reply model configured to generate (e.g., predict) a candidate set of response options (e.g., ranked list of the response options) for the query, based on the query (e.g., query embeddings) and the set of context (e.g., context embeddings); an optional diversity sampling model configured to select a subset of dissimilar response options from the ranked list for presentation to the user (e.g., generate the presented set of response options); and an optional interface configured to present the subset of dissimilar response options to the user. In variants, the models can include neural network models, distance models, and/or other models.

The method 200 can be performed with a system as described above and/or any other suitable system.

2. Technical Advantages

The system and method for automatically determining responses in a messaging platform can confer several technical advantages over current systems and methods.

First, variants of the technology can improve the experience of coaches or other members tasked with conversing with members of a communication platform. This can include, for instance, any or all of: reducing the load and/or annoyance of coaches from experiencing repetitive parts of conversations with the members he or she is coaching; increasing the number of members that the coach is able to handle; decreasing the time and effort that it takes for a coach to converse with (e.g., provide a response to) a member; increasing the approval ratings of coaches due to faster response times and/or more targeted responses; providing more relevant responses to a member's message (e.g., emotionally relevant responses, clinically relevant responses; etc.), and/or other improvements to digital health coaching and/or other treatments. For example, this can improve member responses to treatment faster and more effectively, with lower relapse rates.

In a set of specific examples, the coaches are part of a digital health platform, which enables remote health coaching (e.g., mental health coaching, physical health and/or wellness coaching, etc.) through, among other avenues, messaging with members engaged in (e.g., subscribed to) the platform to provide support, guidance, and/or listening.

Additionally or alternatively, the coaches can be part of any messaging platform (e.g., text messaging, emailing, etc.). Further additionally or alternatively, the technology can be implemented between any users (e.g., platforms absent of coaches, between coaches, between members, between any users, between friends messaging each other, etc.).

Second, variants of the technology can improve the experience of members taking part in a messaging platform (e.g., with coaches, with other members, etc.). In some examples, for instance, the technology enables optimal responses gathered from a corpus of data to be specifically selected based on the context of the messages (e.g., member's mental health state, member's particular health condition, member's particular circumstances, etc.) and provided to the member (e.g., upon selection by the coach). The inventors have discovered, for instance, that increased usage of the system and/or method by coaches in a messaging platform results in higher ratings for the coaches from members, which reflects the improved experience and engagement perceived by the member.

Additionally, the technology can further improve the user experience by preventing coaches from providing redundant responses (e.g., which a member might perceive as an un-engaged coach), and/or the technology can otherwise improve the member experience.

Third, variants of the technology can improve the functioning of a computer and/or are necessarily rooted in computer technology, such as, but not limited to, any or all of: increasing the speed with which message recommendations can be provided to a user while still configuring the messages to be optimal for the conversation (e.g., based on multiple previous messages, based on dynamic changes occurring in the message thread, etc.), leveraging a corpus of previous manually written messages from coaches where any or all of the recommended messages are directly procured from this corpus (e.g., without requiring labeled data for training, without requiring editing of the messages in the corpus, etc.), and/or any other benefits.

Fourth, variants of the technology can enable standardization of care provided across multiple languages. While traditional systems and methods for providing therapy and coaching are rooted in a language-specific context, variants of the present system can determine semantic embeddings of user conversations, where the same message sent in different languages can be mapped to a similar vector representation. In addition, by leveraging messages sent by users in multiple languages, the system can generate response options for users in one language by leveraging messaging data sent through the system in other languages. This can expand the capacity of the system to serve users in languages that otherwise could not be served if adequate training data has not yet been obtained for that specific language.

However, the technology can confer other benefits.

3. System 100.

As shown in FIG. 1, a system 100 for automatically determining responses in a messaging platform can include and/or interface with any or all of: a set of models, a set of processing and/or computing subsystems, and a set of messaging platforms and/or messaging interfaces. Additionally or alternatively, the system can include any other suitable components. Further additionally or alternatively, the system 100 can include and/or interface with any or all of the systems, components, embodiments, and/or examples described in any or all of: U.S. application Ser. No. 13/969,349, filed 16 Aug. 2013; U.S. application Ser. No. 14/839,053, filed 28 Aug. 2015; U.S. application Ser. No. 14/839,232, filed 28 Aug. 2015; U.S. application Ser. No. 15/005,923, filed 25 Jan. 2016; U.S. application Ser. No. 15/069,163, filed 14 Mar. 2016; U.S. application Ser. No. 15/265,454, filed 14 Sep. 2016; and U.S. application Ser. No. 15/482,995, filed 10 Apr. 2017; each of which is incorporated herein in its entirety by this reference.

The system 100 functions to provide automated responses to one or more users participating in a messaging thread, such that the user can select a response from the automated responses to be provided in the thread. As such, the system can function to decrease a mental load associated with composing and/or typing messages, enable the user providing the automated response to focus on more interesting and/or important parts of the conversation, and/or perform any other functions. Additionally or alternatively, the system 100 can function to prevent redundant response options from being provided to the user, reduce the time with which it takes a user to provide a response, and/or can perform any other functions.

One or more instances of the system (e.g., response recommendation system instances) can be used for different: user classes, demographics, languages, pathologies, response corpuses, timeframes, and/or otherwise differ. Alternatively, the same system instance can be used for all users and respondents.

The system 100 preferably interfaces with a set of users, wherein in preferred variations, the set of users refers to both a care team and participants (equivalently referred to herein as members). However, users can refer to any other suitable entity. The care team (equivalently referred to herein as care providers) includes the individuals and/or entities (e.g., humans, bots, etc.) involved in the coaching and/or care of the participant within a messaging platform (e.g., digital health platform, digital mental health platform, digital coaching platform, digital therapy platform, digital mentorship platform, etc.) and can include any or all of: coaches, supervisors (e.g., who supervise coaches, who supervise clinicians, etc.), clinicians (e.g., therapists, psychiatrists, psychologists, physicians, specialists, clinically-trained coaches, etc.), member support persons (e.g., who are involved in supporting the care team members and/or participants, technical support persons, etc.), and/or any other individuals and/or entities. The set of participants (equivalently referred to herein as members and/or patients) preferably refers to individuals partaking in the platform (referred to herein as "receiving care") (e.g., receiving coaching, receiving clinical support, receiving advice, etc.), but can additionally or alternatively refer to any other suitable individuals.

The system 100 can optionally include and/or interface with a set of hubs (equivalently referred to herein as dashboards), wherein the set of hubs preferably functions as user interfaces for any or all of the users, wherein the user interface enables the user to provide and/or receive information (e.g., from other users, from a computing system, etc.). As such, the hubs can include any or all of: a messaging platform (e.g., with which users can exchange information), content (e.g., provided to a participant by his or her coach, provided to a participant automatically, etc.), a notes section (e.g., for a coach to record and/or share his or her observations of a participant, for a coach to communicate his or her observations to another coach and/or a supervisor and/or a clinician, etc.), a check-in section (e.g., to prompt a user to answer surveys, questionnaires, daily check-ins, etc.), and/or any other sections.

In some variations, each of the users is associated with a hub, wherein the types of hubs can include any or all of: a coaching hub for coaches, a supervisor hub for supervisors, a member hub for members (equivalently referred to herein as participants), a clinical hub for clinicians, a member support hub for technical support and/or other member support persons, and/or any other suitable hubs. The hubs can be any or all of: the same (e.g., including the same features, including the same sections, including the same access to information, including the same views, etc.), different, and/or any combination. Additionally or alternatively, the hubs can be otherwise configured.

In preferred variations, any or all of the hubs can be implemented as a client application executable on a user device, wherein the users can log into their respective hubs (e.g., at various devices, at a mobile device, at a desktop device, etc.) through the client application. Each of the hubs is preferably in communication with and/or part of a computing system, preferably a remote computing system, wherein information associated with the hub is updated and/or shared through the remote computing system. Additionally or alternatively, information can be alternatively shared and/or updated.

Additionally or alternatively, the users can be taking part in messaging outside of any particular platform (e.g., engaging in a native text messaging application on their user device(s), engaging in an email conversation on their personal email account, engaging in a phone call conversation on their user device(s), etc.) and/or within any other platforms.

The care team preferably includes a set of coaches, wherein each of the set of coaches interacts with a set of members, and optionally any or all of his or her: supervisors, member support persons, clinicians (e.g., assigned to the coach, assigned to the member, etc.), guardians (e.g., parent, spouse, legal guardian, medical power of attorney, etc.), and/or any other suitable individuals and/or entities.

In a set of examples, each participant is assigned a set of one or more coaches (e.g., wherein a primary coach is assigned to the member and responsible for communicating with the member while the primary coach is online and a set of backup coaches which can fill in for the primary coach if needed). Additionally or alternatively, the member can be assigned a single coach, a random coach (e.g., depending on when the member and the coach are online), and/or any other suitable coaches. The coach care team is preferably fixed but able to be updated for each member (e.g., in an event that a coach leaves or is matched with a different member, in an event that the member and a coach are not a good fit, etc.), but can additionally or alternatively be randomly determined and/or reassigned (e.g., upon login of the member and based on coaches online) and/or otherwise determined or assigned.

The care team further can optionally further include one or more clinical care team members (e.g., licensed clinicians, therapists, psychiatrists, physicians, specialists, trained coaches, etc.), equivalently referred to herein as clinicians, which can be assigned to (e.g., individually, through a clinician care team, etc.) a particular member or set of members, such as in response to an escalation. The clinicians are preferably able to communicate with members and any or all of the other members of the participant's care team (e.g., coaches, supervisors, other clinicians, etc.), but can additionally or alternatively be otherwise in communication (or not in communication) with one or more users.

The care team can optionally include one or more supervisors, wherein the supervisors preferably function to supervise (e.g., monitor, assess, perform quality assurance of, mentor, etc.) the coaches. Additionally or alternatively, the supervisors can function to supervise the quality of response options provided to the coaches. Additionally or alternatively, the supervisors can function to approve and/or otherwise be involved in an escalation of a participant, supervise other care team members (e.g., clinical members), perform other roles (e.g., coaching), and/or perform any other suitable functions.

The care team can optionally include one or more member support persons, which function to assist any or all of the users in use of their hubs, such as in technical support. Additionally or alternatively, the member support persons can perform any other suitable tasks.

The system 100 preferably includes and/or interfaces with one or more sets of data. Data stored and/or received by the system (e.g., in a corpus, in a data store, etc.) can be used to perform any or all other processes of the method. Data can additionally or alternatively be used to evaluate and/or train one or more models. Types of data can include: messages, user data, and/or any other information.

The system 100 can function to receive, store, and optionally process one or more messages (e.g., sent through the platform, sent to the platform, etc.). Messages can include text-based messages, audio messages, video messages, image messages, haptic messages, and/or any other information sent between users. Preferably messages have semantic meaning, but can alternatively not have semantic meaning. Messages are preferably historical (actual messages from actual users), but can alternatively be generated (e.g., using a generative model). Messages can be deidentified (e.g., after receipt and before inclusion in the response option corpus; wherein any personally identifiable information included in a message is removed, replaced with a placeholder, or encrypted prior to storing the message in the system), but can alternatively not be deidentified. Messages can be from a single user or multiple users. Messages can be from a single conversation or multiple conversations (e.g., conversations occurring in the same platform and/or other platforms). Messages can be identified using a message identifier. The message identifier can include: a global identifier (e.g., globally unique identifier); an identifier constructed from a conversation thread identifier, a user identifier, and a locally unique identifier (e.g., locally unique to the conversation thread, timestamp, etc.); a hash of the message; the embedding of the message; and/or any other suitable identifier.

Figure 12:
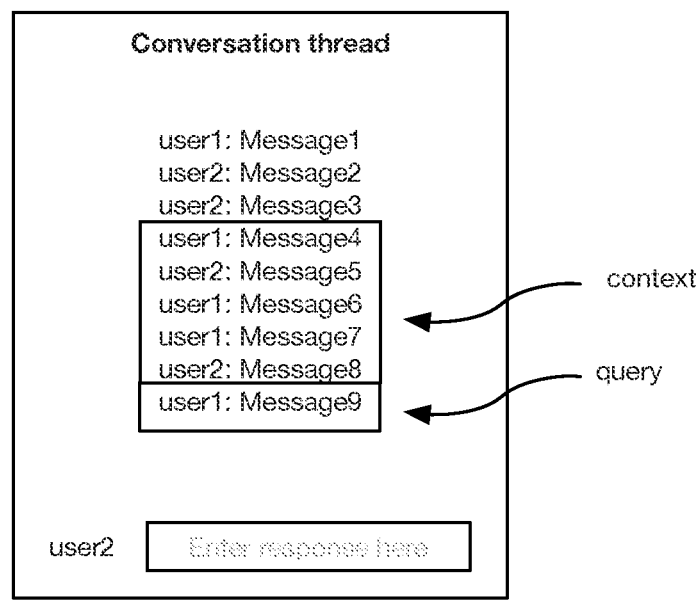
FIG. 12 is an illustrative example of a conversation thread, query, and context.

A conversation thread can include a set of one or more messages sent between a set of interacting users (e.g., one or more coaches and one or more members); example shown in FIG. 12. A conversation thread can include a time series of messages, a set of messages, and/or be otherwise constructed. A conversation thread can be for a single session or multiple sessions. A single session can be defined by an active time window (e.g., all messages sent between two or more users within a particular time window, all messages sent within a threshold duration from the prior message, etc.), an elapsed time window (e.g., wherein a conversation thread ends after an elapsed time has passed between subsequent messages), message content (e.g., containing cues indicating the end of a conversation such as "goodbye"), an input (e.g., wherein a care provider presses a button in their hub indicating the end of a conversation), a login session, and/or be otherwise defined. Each conversation thread can include messages sent by senders and received by recipients. Each interacting user can be a sender or recipient, depending on whether the user sent the message or received the message, respectively. The system can support interactions between one or more interacting user sets, and support one or more conversation threads.

A set of messages within a conversation thread can include a query and a context, and can optionally include a response, and/or any other suitable message type or classification. The system functions to determine a response for a user (responding user) to send to the other user (receiving user).

A query is preferably the last message in the conversation thread, but can alternatively be the last question in the thread, the last message from the other user, the second to last message from the other user, the last message from the responding user, and/or be any other suitable message.

The context (e.g., a set of context messages) includes a set of messages. The context can be from the conversation thread (e.g., subset of messages), be from past conversation threads (e.g., with the same set of interacting users, the same receiving user, the same responding user, etc.), and/or from any other suitable conversation thread. The context can include or exclude the query. The conversation thread can include a set of messages sent within a predetermined conversation window, a set of messages satisfying a set of conditions (e.g., sent within the conversation window, only messages sent by the receiving user, only messages sent by the responding user, etc.), and/or be otherwise defined. The conversation window can be defined by time, a number of messages, be dynamically determined (e.g., adjusted based on the sentiment, tone, etc. of the query, etc.), and/or otherwise defined. The conversation window can be defined relative to: the query, the to-be-determined response, the message preceding the query, a predetermined number of messages preceding the query, the last message sent by the responding user, the last message sent by the other user, the current time (e.g., wall clock time), the query time, a time for any of the aforementioned messages, and/or relative to any other suitable reference. The conversation window can be a window: immediately preceding the query, immediately preceding and including the query; multiple windows (e.g., first predefined number of messages in the conversation and most recent predefined number of messages in the conversation; first predefined number of seconds of the conversation and most recent predefined number of seconds of the conversation; etc.); and/or any other window within the conversation. In examples, the conversation window can include: all prior messages sent in the conversation; a set number of messages sent in the conversation (e.g., 3 messages, 4 messages, etc.); all messages sent within a specific time window (e.g., last minute, last 5 minutes, last 10 minutes, etc.); a random subset of messages; and/or other intervals of messages. However, the context can be otherwise defined.

The system 100 can optionally function to convert one or more messages into a standard format defined by the system. In variants, the original format, the converted format, or both can be stored by the system. In a first example, the system can transcribe audio messages into text-based messages. In a second example, the system can determine metadata associated with and/or a text-based description of an image-based message or portion of a message (e.g., an emoji, a gif, an image, a video, etc.). Optionally, the standardized format of the message rather than the original format is used to perform steps of the method (e.g., as inputs for S100, as in input for S200, as the output of S300, for model training, etc.). Additionally or alternatively, the original format is used to perform steps of the method.

Optionally, the system can further function to remove personally identifiable information (PII), contextual information from a message (e.g., deidentify the message), and/or other sensitive information from the message. Sensitive information can include: the name of another party, pronouns, a location, a date, a time, an action, an item, a quantity, specific identifiers, and/or any other information contained within a message. Optionally, sensitive information removed from a message can be replaced with a placeholder to preserve the semantic meaning of the message. The placeholder can include a more generic term encompassing the removed information, a slot, and/or be any other suitable placeholder. In examples, PII is replaced with a placeholder such as: a user's name is replaced with "<name>"; a birthdate is replaced with "<birthdate>"; a mention of a rare medical condition (e.g., a specific form of cancer, a rare mental illness, etc.) is replaced with an accurate generic condition (e.g., "<cancer>", "depression", etc.); and/or any other suitable replacements. In further examples, the system can generalize the message. Contextual information (e.g., mentions of: the time of day a conversation takes place, the current season, a recent news event, etc.) can be replaced with a generic placeholder (e.g., "current time", "current season", "today's headline", etc.). Optionally, the system labels or otherwise identifies the placeholder as a placeholder for subsequent replacement by the personalization model. By replacing certain terms with placeholders, the system can confer the additional benefit of reducing the amount of training data needed to determine relevant responses to a query. Terms to replace can be determined based on a category (e.g., all names, all dates, etc.), from a list (e.g., a list of words to remove), and/or any other suitable criteria.

User data can include coach preferences, member preferences, participant information, provider information, and/or any other suitable information. The user data can include any data and/or metadata collected by the system in association with a particular user. Participant information can include: demographics, medical history, past check-in and/or survey responses, any other information provided to the platform by the user, any information uploaded to the platform by another entity on behalf of the user (e.g., notes sent from a medical provider, medical records from a physician's office, information sent by a guardian, etc.), notes taken about the participant by another user (e.g., by the coach, by the care team, by a technical support person, etc.), and/or any other information. Metadata can include platform usage data (e.g., raw data and/or trends), conversation data (e.g., number of messages, number of conversation threads, messaging frequency, etc.), tone, and/or other data. Platform usage data can include: log-in times, log-off times, active times, preferred content, time spent viewing content, time spent engaging in a conversation, and/or any other information.

The system 100 can include one or more message corpuses. The message corpuses can include: response corpuses, query corpuses, context corpuses, and/or other corpuses. The response corpus can provide message response options for the automated response outputs, and/or be otherwise used. Additionally or alternatively, historical responses stored in the corpus can be used as query, context, and/or response training data for model training and/or evaluation. All or a portion of the message corpuses (e.g., the response corpus) can include: historical messages (e.g., messages authored by users, messages selected by users, etc.), generated messages (e.g., generated using a generative model), message templates, and/or other messages. The corpuses can store raw messages, metadata associated with messages (e.g., user that generated the message, message author's user type, timestamp, conversation thread ID, label as a parent message and/or child message, etc.), embeddings of the messages, user data (e.g., deidentified user data relevant to a conversation), and/or other message data. Messages stored in a corpus can be stored as conversation threads, as sets (e.g., response and query, response and context, response and query and context.), as individual messages, and/or otherwise stored. The corpus can store every instance of a particular message; a single instance of a particular message (e.g., unique message), optionally with a count or a frequency associated with the occurrence of the message; and/or otherwise represent repeat messaged appearing in the corpus. Messages stored in a corpus can include: all messages sent in and/or received by the platform; messages specific to a parameter (e.g., user, user class, user rating, conversation, geolocation, etc.); messages that satisfy an inclusion criterion (e.g., meets a frequency threshold, etc.); and/or other messages. In examples, the system can include multiple corpuses that are specific to at least one parameter (e.g., a user-specific corpus, a corpus of coach-only responses, a corpus of top-rated coach responses, a corpus specific to messages sent within a specific timeframe, a corpus of sentiment-specific responses, etc.). Optionally, a corpus specific to a user can be used as input for personalization of automatically generated response options (e.g., wherein a user is presented with one or more response options from their own user-specific corpus). For example, the system can include a user-specific corpus for every user on the platform, wherein each user-specific corpus includes messages sent by the user, and can optionally include a generic corpus, including messages sent by all users (and/or all users of a specific user class, such as coaches).

The system 100 preferably includes and/or interfaces with a set of models, wherein the set of models functions to determine a set of automated message responses to be provided to the set of coaches while engaging in conversations with one or more members. Additionally or alternatively, the set of models can produce any other outcomes and/or be otherwise implemented.

The set of models preferably include a set of trained models. Models can be trained through: supervised learning, unsupervised learning, semi-supervised learning, reinforcement learning, transfer learning, and/or any other training methods. The models can be: machine learning models, statistical models, algorithms, rule-based models, similarity models (e.g., configured to calculate similarity scores between a set of options), and/or other models. Examples of models that can be used can include: deep learning models (e.g., feed forward neural network, recurrent neural network, convolutional neural network, etc.), neural networks, language models, autoencoders, support vector machines, Bayesian networks, maximum entropy models, conditional random fields, regression, clustering, nearest neighbors, decision trees, random forests, classifiers, combinations thereof, and/or any other machine learning model.

In variants, the system 100 can include one or more of: an embedding model, a smart reply model, a diversity sampling model, a personalization model, and/or any other models. Optionally, the functionality of any of the models described herein can be combined into one or more models (e.g., wherein the smart reply model automatically performs diversity sampling and/or personalization). One or more models can be executed remotely (e.g., on a remote server, on the cloud, etc.), on a local device (user device), and/or otherwise executed.

The system can include one or more models of each type. When the system includes multiple models of the same type (e.g., multiple smart reply models), the system can include a different model for different: geographies, user classes, timeframes, languages, and/or other parameters.

The system 100 can include one or more embedding models, which can function to compress and/or otherwise convert data (e.g., messages, images, audio, video, user data, etc.) into a vector form (e.g., an embedding, a feature vector, etc.). Additionally or alternatively, data can be hashed. The embedding model can be used: each time data (e.g., a message) is received, prior to storing data (e.g., wherein data is sorted by the system in its embedded form), prior to or after deidentifying the data, when the method is initiated, prior to response option evaluation, and/or at any other suitable time.

In variants, the embedding model can convert the message into a common embedding space (e.g., latent space). The embeddings are preferably semantic embeddings (e.g., that capture the semantic meaning of the message), but can alternatively be word embeddings or string embeddings (e.g., that represent the words themselves), pixel embeddings, and/or any other suitable embedding. In variants, the embedding can preserve semantic information from the original data. In variants, the embedding can be language agnostic (e.g., wherein the same embedding is encoded for the same semantic meaning across languages). Alternatively, the embedding can be language specific or language semi-specific (e.g., wherein a similar embedding is encoded for same semantic meaning across languages). However, the embedding model can extract features from the message and/or otherwise represent the message.

Embedding models can include one or more: query embedding models, context embedding models, response embedding models, message embedding models (e.g., the same type of embedding model to embed each of the query, context, and response type messages), user data embedding models, and/or any other specific embedding models. Alternatively, the system can include a single embedding model. The same model (e.g., a message-to-embedding model) and/or different models can be used to embed messages of different types (e.g., query, context, response, etc.). The same and/or different models can additionally be used to embed user data, and/or any other information.

The query is preferably embedded into a single embedding, but can be otherwise embedded.

The context can be embedded into a context embedding set. The context embedding set can include a single embedding or a plurality of embeddings. Each message in the context is preferably embedded individually (e.g., individual embeddings are generated for each context message). In this variant, the individual context message embeddings can be concatenated together, averaged, summed, and/or otherwise merged before use by the smart reply model; alternatively, the individual context embeddings can be individually provided to the smart reply model. Alternatively, the entire set of context messages (e.g., multiple messages) are embedded into a single embedding (e.g., a single embedding is generated for multiple messages). However, the context can be otherwise embedded.

The embedding model can be: deterministic (e.g., wherein the model always generates the same embedding given the same input) or nondeterministic (e.g., probabilistic). Example embedding models can include and/or depend on: convolutional neural networks (CNNs), deep neural networks (DNNs), generative models, singular value decomposition (SVD), locality sensitive hashing (LSH), principal component analysis (PCA), Word2Vec, BERT, GloVe, large language models (LLMs), recommender systems, encoders (e.g., the encoder portion of an autoencoder trained end-to-end to predict the input message, trained end-to-end to predict a related concept in another language, etc.), all or a subset of the layers from a classifier, and/or any other embedding models or techniques. In variants, the embedding model can be monolingual, pseudo cross-lingual, cross-lingual, jointly optimized (e.g., across languages), and/or otherwise configured. In variants, the embedding model can be trained by the system. The embedding model can additionally or alternatively use an off-the-shelf model.

Figure 10A:
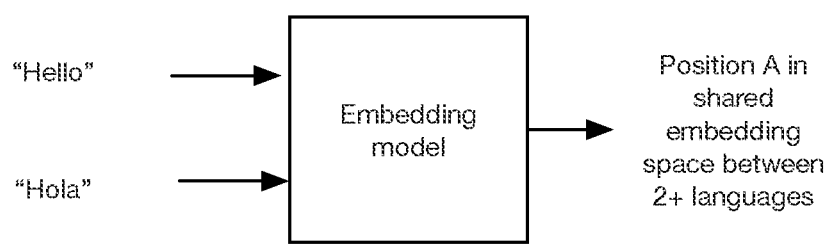
FIGS. 10A and 10B depict examples of mapping messages to an embedding space.
Figure 10B:
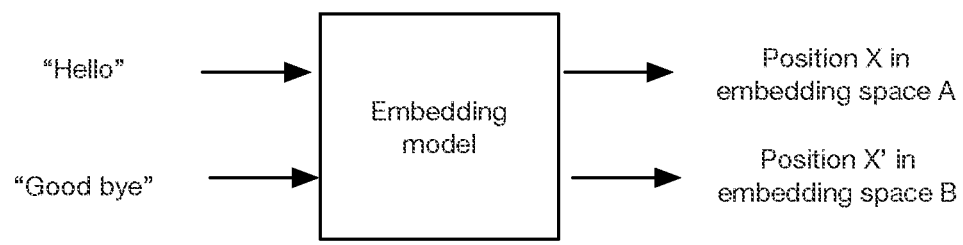
Figure 11:
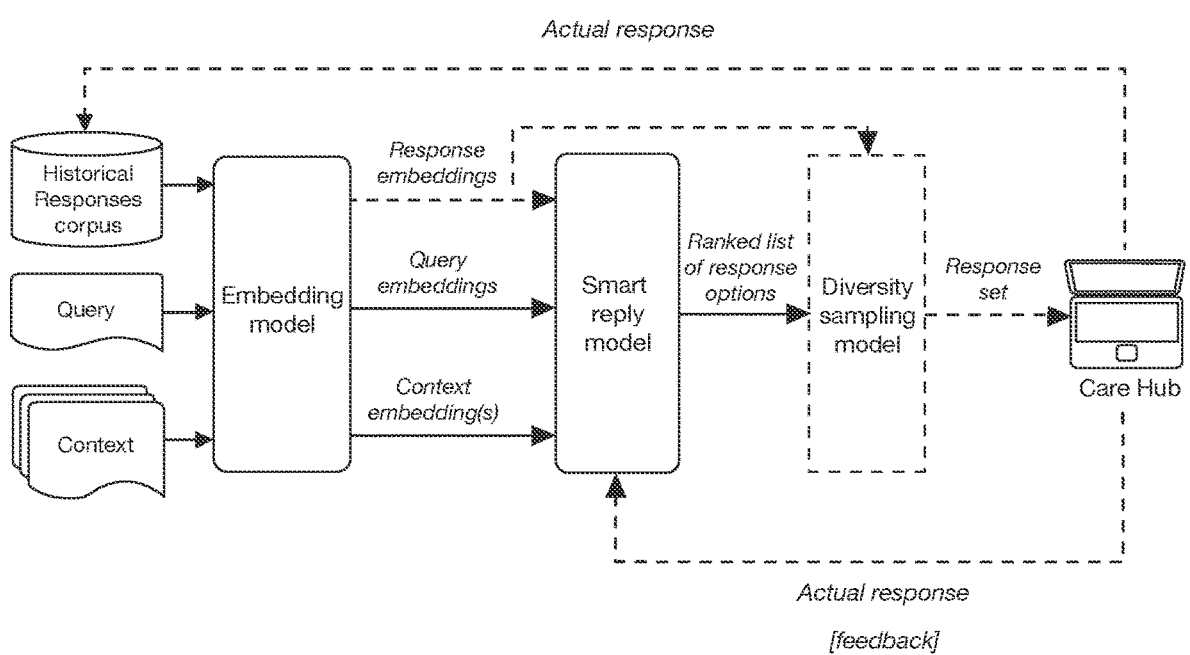
FIG. 11 is an illustrative example of a variant of the system for determining responses.

In a first variant (e.g., monolingual training), the embedding model can be trained on monolingual word embeddings on large monolingual corpus of data (e.g., messages). Each word in a language can be mapped into an embedding space unique to that language (e.g., example shown in FIG. 10B). Optionally, the model can be subsequently trained to learn a linear mapping between monolingual representations in different languages to enable them to map unknown words from the source language to the target language. Alternative transformations between an embedding space in a first language and an embedding space in a second language can be used.

In a second variant (e.g., pseudo-cross-lingual training), the embedding model can be trained on a pseudo-cross-lingual corpus including mixed contents of different languages.

In a third variant (e.g., cross-lingual training), the embedding model can be trained on a parallel corpus including contexts of different languages. The embedding model can optimize a cross-lingual constraint between embeddings of different languages that encourages close proximity of embeddings of similar words across languages in a shared embedding space (e.g., vector space, example shown in FIG. 10A). In examples, a parallel corpus can be or include: a lexicon, document-aligned data, sentence-aligned data, word-aligned data, and/or any other cross-lingual representation.

In a fourth variant (e.g., joint optimization), the embedding model can be trained on parallel or monolingual data (e.g., messages). The model can be trained to jointly optimize a combination of monolingual and cross-lingual losses.

However, the embedding model can be otherwise configured.

The system 100 can include one or more smart reply models, which can function to determine a set of response options (e.g., a candidate set of response options, the presentation set of response options, etc.). In variants, the smart reply model can determine a ranked list of response options, determine a relevancy for each of a set of response options, select a set of one or more response options from the corpus, and/or provide any other suitable output. The smart reply model can determine the outputs based on a set of inputs, including: message data (e.g., query information, context information, historical response information, etc.), user data, and/or any other information. Preferably, the set of inputs includes embedded data (e.g., a query embedding, a set of context embeddings, a set of historical response embeddings, a message embedding, a set of user data embeddings, etc.), but can additionally or alternatively include non-embedded data. In a first example, a smart reply model determines (e.g., predicts, infers) an output based on the query embedding and the context embedding(s). In a second example, the smart reply model determines an output based on the query embedding, the context embedding(s), and the response option embedding(s) (e.g., wherein the response option embeddings can be provided in a side channel or as a direct input). However, the smart reply model can determine the output based on any other suitable set of inputs.

The smart reply model outputs can include: a candidate set of response options, such as a ranked list of response options (e.g., ranked list of the response corpus), a set of response options (e.g., a subset of the response corpus, a set of dissimilar response options from the response corpus, etc.); a single response option; a score for each response option (e.g., confidence score, relevancy score, ranking, etc.); and/or any other suitable output. The smart reply model can output the candidate set of response options as: actual response options (e.g., text), response embeddings (e.g., wherein each response embedding corresponds to a response option), response IDs (e.g., wherein each response ID corresponds to a response option), and/or any other suitable set of information that can be used to represent and/or map to a response option. The response ID can be a unique identifier, a non-unique identifier, a tag, metadata associated with a response option, semantic, non-semantic, and/or otherwise defined.

Preferably, the smart reply model outputs the candidate set of response options arranged in a ranked list, but can alternatively output an un-ranked set. Response options are preferably from a corpus of response options (e.g., response corpus), but can additionally or alternatively be generated, drawn from an external source, and/or otherwise determined. The response options of the ranked list can be ranked based on a score, such as a similarity score between a predicted response and the response options.

In a first variant, the smart reply model outputs a ranked list of all available response options.

In a second variant, the smart reply model outputs a ranked list containing a predefined quantity of the top response options. The quantity of response options returned by the smart reply model can be a percentile (e.g., top 1% top 5%, top 10%, top 20%, etc.), a quantity (e.g., 3, 4, 5, 10, etc.), and/or otherwise defined. In an example, the top number of response options are automatically selected by the smart reply model, and diversity sampling is applied to the ranked list. In a second example, the smart reply model adds the top response options to the ranked list in a while loop, and ensures that each subsequently added response option satisfies a diversity criterion based on the existing members of the ranked list. In a third example, the predefined quantity of response options can be variable based on a condition such as: user class, conversation content, score, user preference, and/or any other condition.

In a third variant, the smart reply model outputs a ranked list containing only relevant response options. In an example, all relevant response options exceed a threshold score. The relevance (e.g., threshold score) can be determined based on a similarity between a predicted response and the response option.

In a fourth variant, the smart reply model outputs a set of response options and a ranking per response option. In examples, the set can include all response options, only response options that meet a threshold ranking (e.g., all response options ranked over 95%), the top ranked response options (e.g., the top 20 ranked response options), and/or any other set of response options. Optionally, the ranked list can be generated by ordering the response options based on the rankings.

In a fifth variant, the smart reply model outputs a ranked list for a particular user containing one or more response options associated with the user. In an example, one or more response options is drawn from a corpus of the user's historical responses. The response options can be stored in a user-specific corpus, or stored in a broader corpus in association with the user (e.g., wherein the response options are labeled, grouped, or otherwise associated with the user). In another example, one or more response options is drawn from a corpus of historical responses by users of the same user class (e.g., coach, healthcare provider, member support, etc.) as the user.

However, the smart reply model can include any combination of the variants described, and/or otherwise function.

In variants, the response options can be determined for the next response epoch (e.g., in direct response to the query), for a future response epoch (e.g., determine a response to the anticipated receiving user's response to the responding user's response), and/or for any other suitable response epoch. The response options for each response epoch can be provided individually, merged together, and/or otherwise managed.

The smart reply model can be deterministic (e.g., wherein the model always generates the same set of response options given the same input) or nondeterministic (e.g., probabilistic). Example smart reply models can include and/or depend on: Learning to Rank (e.g., machine-learned ranking (MLR)), classifiers, ranking models (pointwise methods, pairwise methods, listwise methods, etc.), machine learning models (e.g., decision tree, neural network, etc.), and/or any other suitable model. In variants, the smart reply model can be generic (e.g., used for any response option set), or alternatively specific to a user, a user class, a conversation category (e.g., coaching session, therapy session, technical support session, etc.), and/or any other parameter. The smart reply model can be static, or alternatively the smart reply model can be retrained and/or tuned: periodically, in response to a trigger (e.g., manual selection, each time a new conversation thread is terminated, etc.), for a new response option set (e.g., tuned to the set), and/or at any other suitable time.

Figure 6A:
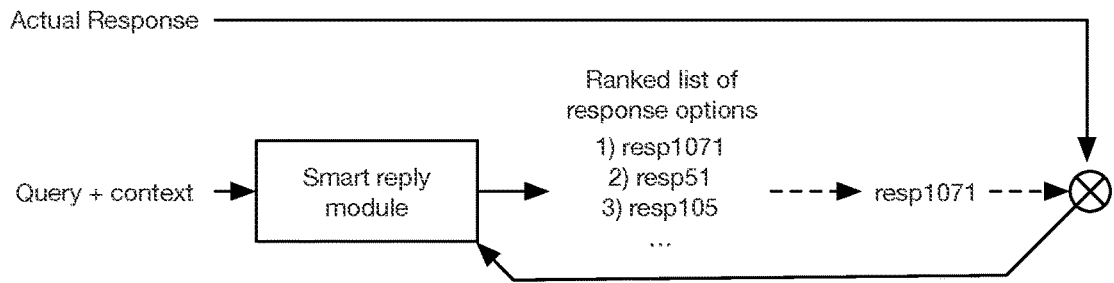
FIGS. 6A-6C depict examples of smart reply model training.
Figure 6B:
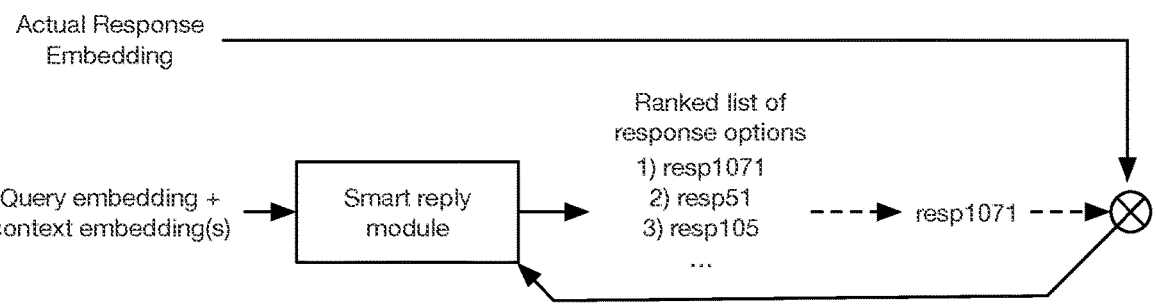
Figure 6C:
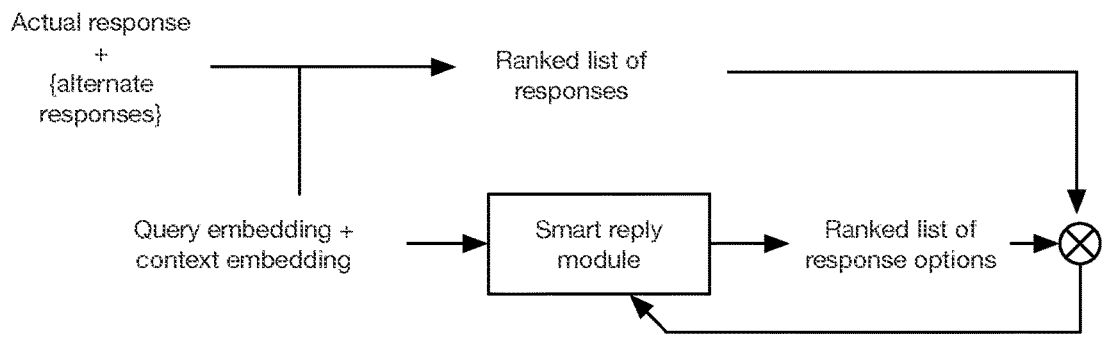

In variants, the smart reply model can be evaluated using ranking metrics such as mean average precision (MAP), discounted cumulative gain (DCG), NDCG, Kendall's tau, Spearman's rho, expected reciprocal rank scoring models, and/or any other suitable metric. In variants, inputs for training the smart reply model can include: a set of messages (e.g., query message and context message, example shown in FIG. 6A), a set of message embeddings (e.g., query embedding and context embedding, example shown in FIG. 6B), further information and/or embeddings of information stored in the system, and/or any other information. In variants, training targets for the smart reply model can include: a message (e.g., response message, example shown in FIG. 6A), a message embedding (e.g., response embedding, example shown in FIG. 6B), a ranked list of responses and/or response embeddings (e.g., example shown in FIG. 6C), and/or any other information.

In a first variant, the smart reply model can be trained to rank each of a set of input response options based on the query and optionally context (e.g., query embedding and context embedding set, respectively; training query embedding and a training context embedding set; etc.). The training query embedding and a training context embedding set can be associated with an actual response (training response). The training query, training context, and training response are preferably from a historical conversation thread, but can be synthetic or otherwise generated. The top-ranked response option(s) from the resultant ranked list can then be compared against the actual response (training response), and the model can be trained based on the comparison (e.g., examples shown in FIGS. 6A and 6B). The comparison can be based on: an exact match between the predicted response and actual response, a similarity score (e.g., distance-based similarity) between the predicted response and actual response, or any other metric.

In a second variant, the smart reply model can be trained to predict a relevance (e.g., score, probability, etc.) of each response of a set of response options to a given input. The input can include a query. The training target can include an actual response to the query. Optionally the inputs can further include a context and any other information. In this variant, the model can be a multi-headed model (e.g., wherein each head corresponds to a response option), and can predict a relevance probability of the respective response option to the query. Response options can optionally be organized based on descending relevance. The highest-probability response option can then be compared against the actual response (e.g., based on the similarity score between the predicted and actual response, based on whether the responses match, etc.), and the model can be trained on the comparison.

In a third variant, the training target is a predetermined ranked list of valid response options to a query. The ranked list of valid response options can be generated manually, and/or include actual historical responses to the query. The smart reply model is trained to predict a ranked list that matches the predetermined ranked list.

However, the smart reply model can be otherwise configured.

The system 100 can optionally include one or more diversity sampling models, which can function to guarantee that the final set of response options (e.g., set of response options, presented response options, returned response options, message predictions, message options, candidate response subset, etc.) presented to the user doesn't include redundant response options. The diversity sampling model can also function to ensure that the same query doesn't always map to the same response and/or ensure that different response options are provided to the user, which can confer the benefit of preventing messages sent within the system being perceived by the user as too robotic or impersonal. The diversity sampling model can determine a similarity metric between one or more response options, and determine a set of response options (e.g., for presentation to the user) that have at least a threshold amount of dissimilarity (e.g., such that the similarity metric between each of the response options in the set meets a relative diversity criterion) and/or do not surpass a threshold amount of similarity. In examples, the diversity sampling model can select response options from the ranked list (e.g., output by the smart reply model) based on an embedding distance between closely ranked response options in the list.

Figure 8:
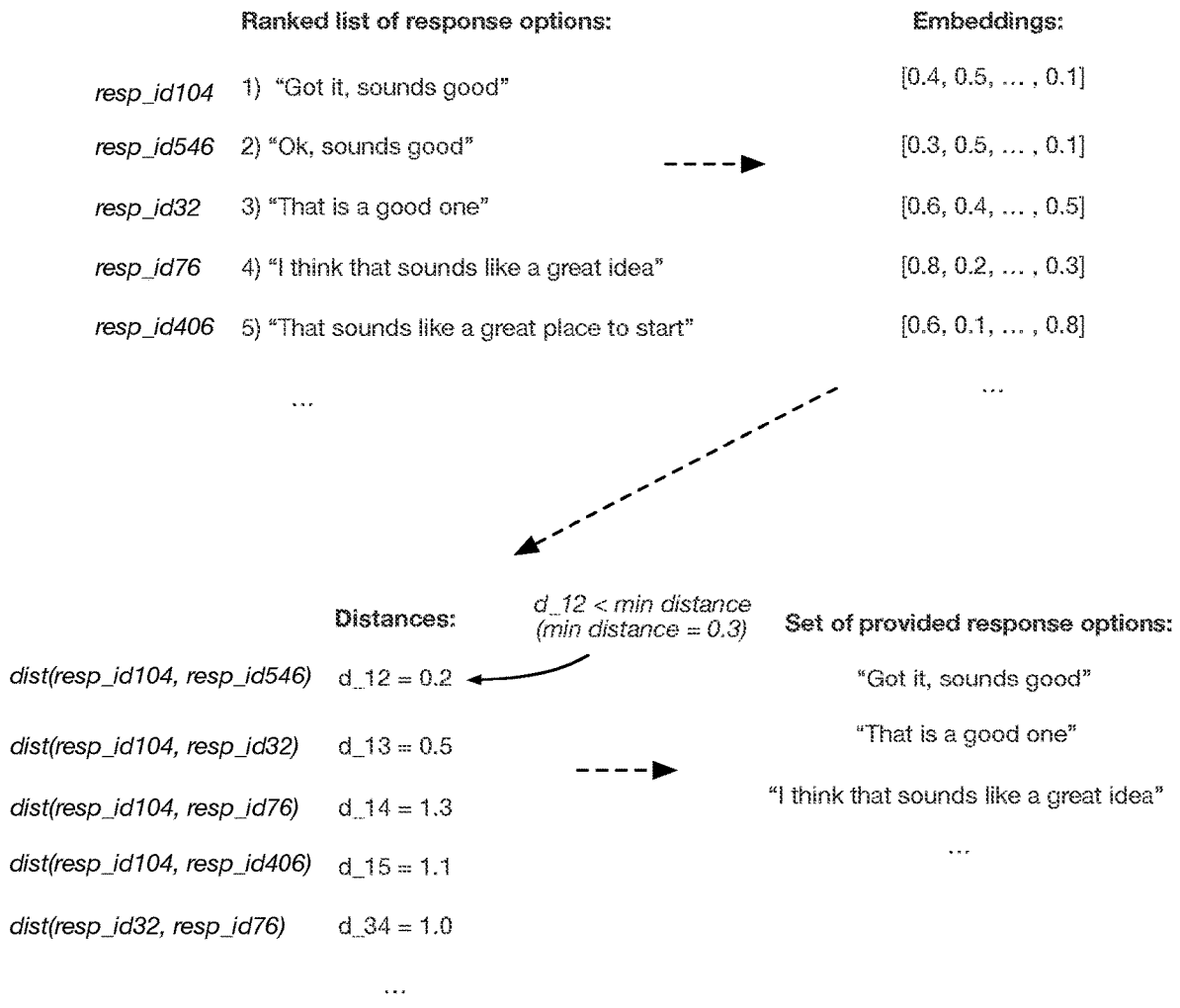
FIG. 8 depicts an example of any or all of selecting response options from a ranked list.

The similarity metric can be: a similarity score, a dissimilarity score, a distance, and/or otherwise defined. A similarity score can be a metric of the similarity (e.g., percentage-based, binary, distance, embedding distance, etc.) between two or more response options (e.g., the response options, the embeddings of the response options, etc.). A dissimilarity score (e.g., percentage-based, binary, distance, etc.) can be a metric of the dissimilarity between two or more options. In examples, closely-embedded response options would have a high similarity score and/or a low dissimilarity score. The distance can be determined between the embeddings of two or more responses (e.g., two predicted responses, the predicted response and the actual response, example shown in FIG. 8, etc.). The distance can be determined using: edit distance metrics (e.g., Levenshtein distance), Longest Common Substring (LCS), Hamming Distance, Minkowski distance, Cosine Similarity, Jaccard Distance, norms, Euclidean Distance, city block distance, Sellers' algorithm, dynamic programming, and/or any other similarity distance metrics or techniques. However, the similarity metric can additionally or alternatively be determined based on the response option's historic usage frequency (e.g., higher or lower-scored based on increased usage), user diversity (e.g., higher scored based on higher diversity of users using the response option), weight (e.g., calculated based on metadata, analytics, etc.), recency of use (e.g., by the same or different user), and/or other information. The similarity metric is preferably determined based on the semantic embeddings, but can additionally or alternatively be determined based on the string embeddings (e.g., such that similarity and/or dissimilarity can be determined based on a percentage of overlapping text, such as phrases, words, etc.), tone, sentiment, and/or other embeddings, features, or dimensionality reductions. The diversity criterion can be: a threshold (e.g., the similarity score must exceed a threshold, the dissimilarity score cannot exceed a threshold, the distance must exceed a threshold, the distance must not exceed a threshold, etc.), a value (e.g., the embeddings must differ beyond a predetermined value), and/or be any other suitable criterion. In an example, the threshold dissimilarity can include a minimum distance between response options. In another example, the threshold similarity comprises a maximum distance between response options. The diversity sampling model preferably determines a set of response options (e.g., presented response option set) such that the similarity metric between each of the response options in the set satisfies the diversity criterion.

In a first variant, the diversity sampling model selects a number of the top ranked response options from the ranked list (e.g., the top 3 response options) as the presented response option set, excluding or skipping any response options that are too similar to a higher-ranked response option (e.g., as determined based on the similarity metric). In an example, the first ranked response option is added to the set, a similarity metric between the first ranked response option and next ranked response option is evaluated. The next-ranked response option is added to the set if the similarity metric satisfies the criteria, and is not added if the similarity metric fails the diversity criterion (e.g., if the similarity score is too high, if the dissimilarity score is too low, if the distance between the response option embeddings is too low, etc.). In the latter case, the process is repeated for successive response options in the ranked list, wherein the similarity metric can be evaluated against all response options already in the set. This can be performed iteratively until a desired quantity of response options is selected.

In a second variant, the diversity sampling model determines a set of diverse response options by iteratively randomly sampling from the ranked list, and only adding subsequent response options that satisfy the diversity criterion based on the existing members of the set. In an example, if a first response option is added to the set, no subsequent response options can be added that are more than 10% similar to the first response option. Additionally or alternatively, the diversity sampling model can randomly select dissimilar response options from a segment of the ranked list (e.g., the top 1%, 5%, 10%, etc. of the ranked list).

In a third variant, the diversity sampling model determines a set of semantic clusters within the ranked list, and selects no more than one response option from each cluster. The semantic clusters can be determined such that each member of a semantic cluster has a similarity score with each other member of the cluster exceeding a threshold (e.g., surpassing a minimum distance, surpassing a minimum percentage similarity, etc.). In an example, each semantic cluster can include closely-embedded response options. The top response option from one or more clusters can be selected for the set of response options. Additionally or alternatively, a random response option from one or more clusters can be selected for the set of response options.

In a fourth variant, the diversity sampling model performs an optimization to determine a set of response options. In an example, the objective is to maximize the dissimilarity (or alternatively minimize the similarity) between the response options and the predicted response, while the constraints include a diversity criterion for all members of the set. Alternatively, the objective can be to maximize diversity, while the constraints can include a performance metric (e.g., based on a similarity metric between the response options and the predicted response).

In a fifth variant, the diversity sampling model can be a component of the smart reply model, wherein the smart reply model outputs a ranked list such that each element of the list satisfies a diversity criterion (e.g., relative to the other members of the list). In an example, the smart reply model is evaluated based on performance metrics including diversity of the ranked list.

In a sixth variant, the system can lack a diversity sampling model. In this variant, the response option set can be generated using a set of rules, or otherwise determined. For example, the top response options from the ranked list can be treated as the response option set, response options can be randomly selected (e.g., irrespective of similarity) from all or a segment of the ranked list, and/or the response option set can be otherwise defined.

However, the diversity sampling model can be otherwise configured.

The system 100 can optionally include one or more personalization models, which can function to modify one or more response options based on a particular user, user class, contextual information, and/or any other information. The user can be the user receiving the message, the user sending the message, both, and/or otherwise specified.

Figure 9:
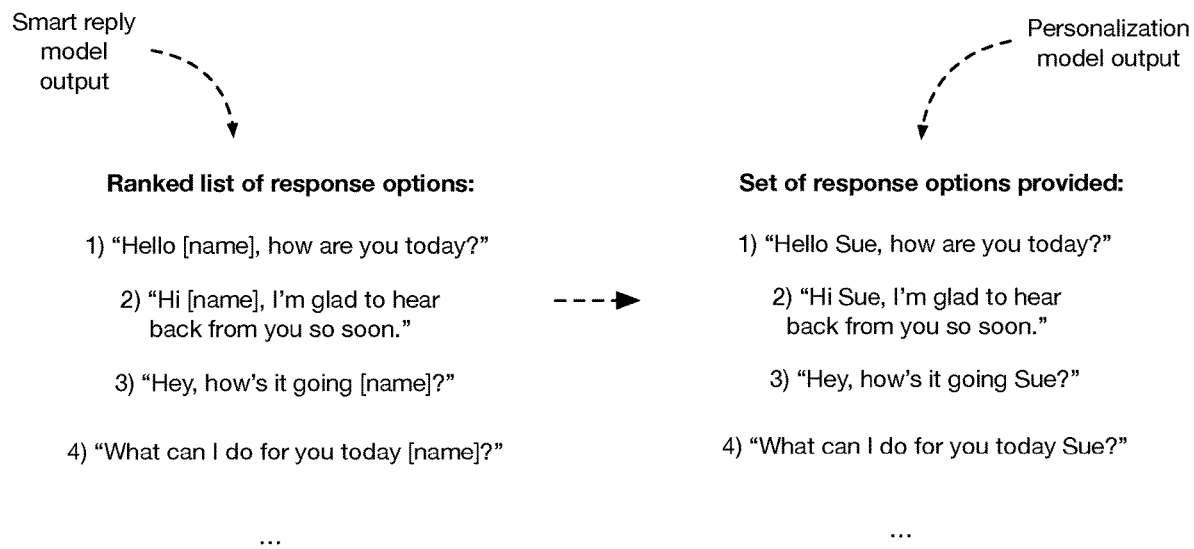
FIG. 9 depicts an example of message personalization.

In a first variant, the personalization model inserts user-specific information (e.g., PII) and/or contextual information into a response option generated by the smart reply model (e.g., example shown in FIG. 9). In an example, the personalization model inserts a participant's name into an automated response option for a greeting presented to the participant's coach (e.g., "Hello, Joe"). In another example, given the query "I'm mad at my brother", the personalization model includes the subject (the brother) in a response option that has a placeholder (e.g., "why are you mad at subject?" becomes "why are you mad at your brother?").

In a second variant, the personalization model performs a spelling and/or a grammar check and optionally modifies a response option to ensure the quality of the response.

In a third variant, the personalization model modifies the tone of a response option based on a user (e.g., the recipient, the sender, both, etc.). In an example, the tone is determined based on a corpus of historical responses associated with the user. In an example, a generative model can be used to tune one or more of the sets of response options to introduce the user's historical tone. Alternatively, the tone can be otherwise applied to the response options.

However, the personalization model can be otherwise configured.

Optionally, the functionality of any of the models and/or model variants described herein can be combined into one or more models.

The system 100 further preferably includes and/or interfaces with a set of computing and/or processing subsystems that are configured to perform any or all of the processes of the method 200. Additionally or alternatively, the computing and/or processing subsystem(s) can perform any other functions, such as storing the set of models, storing any or all of the set of inputs, and/or performing any other functions.

In a preferred set of variations, the system 100 interfaces with a remote computing subsystem (e.g., cloud-based computing system) in communication with client applications executing the hubs. Additionally or alternatively, the computing system can include local computing subsystems (e.g., at user devices executing the client application), or any combination. Additionally or alternatively, the computing system can interface with an external platform (e.g., a native text messaging application on a user device, an email application, etc.).

Additionally or alternatively, the system 100 can include any other suitable components and/or combination of components.

4. Method 200.

As shown in FIG. 2, the method 200 for automatically determining responses in a messaging platform includes any or all of: receiving a set of inputs S100; determining a set of response options based on the set of inputs S200; and providing the set of response options to a user S300. Additionally or alternatively, the method 200 can include training and/or updating a set of models, and/or any or all of the processes described in any or all of: U.S. application Ser. No. 13/969,349, filed 16 Aug. 2013; U.S. application Ser. No. 14/839,053, filed 28 Aug. 2015; U.S. application Ser. No. 14/839,232, filed 28 Aug. 2015; U.S. application Ser. No. 15/005,923, filed 25 Jan. 2016; U.S. application Ser. No. 15/069,163, filed 14 Mar. 2016; U.S. application Ser. No. 15/265,454, filed 14 Sep. 2016; and U.S. application Ser. No. 15/482,995, filed 10 Apr. 2017; each of which is incorporated herein in its entirety by this reference, or any other suitable processes performed in any suitable order.

The method 200 preferably functions to provide users with automated response options which they can choose to use (or not use) while conversing in a message thread, and/or provide users with prompts that they can modify or use as a reference to generate their own (e.g., new) response. Additionally, the method 200 can function to: determine (e.g., with a set of trained machine learning models) an optimal set of response options to be provided to a user (e.g., coach), provide response options which had previously been manually generated and provided by a real user, reduce redundancy in the set of response options such that the user can select from distinctly different response options, and/or can perform any other functions. Optionally, the method 200 can function to automatically generate and send a response on behalf of the user.

With this functionality, the method 200 can further function to: increase the efficiency of coaches engaging with members (e.g., multiple members) in a platform; increase the number of members that a coach can be assigned to and engaged with; increase the joy of messaging to coaches through allowing them to focus on the most important and/or impactful and/or unique parts of messages; and/or can confer any other benefits for any users (e.g., coaches, members, etc.).

The method 200 is preferably performed continuously throughout any or all messaging conversations taking place in a messaging platform. In a preferred set of variations, for instance, the method 200 is performed throughout (e.g., continuously, in response to each new message, etc.) each message thread between a coach and a member. In an example, the method is repeated for each message sent in the conversation thread. Additionally or alternatively, the method 200 can be performed throughout messages between other users (e.g., between members, between a coach supervisor and a coach, between a clinician and a coach, between a member support person and another user, etc.), in response to a trigger (e.g., request from a coach or other user, user logging on at a standard and/or unusual time, user opening the messaging platform within their hub, user responding negatively on a check-in, etc.), based on user preferences (e.g., coach turning on an automated response preference), and/or at any other time(s).

In a set of specific examples, the method 200 is performed (e.g., triggered) each time a new message (e.g., manually generated message from a member, manually generated message from a coach, automated response from a coach, etc.) is populated in a thread.

4.1 Method—Receiving a Set of Inputs S100.

The method 200 preferably includes receiving a set of inputs S100, which functions to receive information with which to perform any or all other processes of the method 200. S100 further preferably functions to receive inputs with which to evaluate and/or train a set of one or more models (e.g., as described below) in order to produce a set of automated response options. S100 can additionally or alternatively function to perform any other functions.

The set of inputs are preferably received at a computing system (e.g., remote computing system, platform, system 100, etc.) or set of computing systems (e.g., multiple computers), such as from one or more user interfaces (e.g., via a client application), but can additionally or alternatively be received from any other suitable sources.

S100 is preferably performed each time a message is populated into a message thread, but can additionally or alternatively be performed at a predetermined frequency, in response to a trigger (e.g., request), when a message is received by the user's device, and/or at any other time(s).

The set of inputs preferably includes a set of messages provided within the messaging thread being analyzed, but can additionally or alternatively includes messages from other threads (e.g., with the same member, with the same coach, with a different coach and/or member, etc.), a corpus of manually generated messages (e.g., from coaches), non-message inputs (e.g., coach preferences, member preferences, member information, images, audio recordings, etc.), and/or any other inputs or combination of inputs.

The messages can be any or all of: manually generated (e.g., by a coach, by a member, etc.), automatically generated (e.g., based on a previous performance of the method 200), and/or any combination.

The messages can be from any user in the thread, such as a coach, member, and/or any other user or combination of users.

The set of messages preferably includes a most recent message (equivalently referred to herein as a query) provided in the thread, wherein each message received in a thread preferably functions to trigger an instance of the method 200. Additionally or alternatively, any other messages can be received and/or used to trigger any or all of the method.

The set of messages further preferably includes a set of other messages in the thread (which are collectively equivalently referred to herein as a context and/or context messages), which function to provide a context for the last received message. The context messages preferably include a predetermined number of messages (e.g., 1, 2, 3, 4, 5, 6, 7, 8, 9, 10, between 1 and 5, between 5 and 10, greater than 10, etc.; a dynamically determined number of messages; etc.) in the thread received immediately prior to the query message, but can additionally or alternatively include any or all of: every other message previously received in the thread, messages from other threads (e.g., with the same member, with the same coach, etc.), all other messages in the thread, all other messages received within a predetermined time period (e.g., last minute, last 5 minutes, last hour, between the last 5 minutes and last 15 minutes, etc.), all other messages received from a particular user (e.g., member, coach, etc.) in the thread, a random number of messages, and/or any other messages.

The models implemented in S200 further preferably receive as input and/or interface with a corpus (e.g., database, data store, etc.) of previously generated messages (equivalently referred to herein as historical responses), which function to provide response options for the automated response outputs. In preferred variations, the corpus of messages includes actual, manually generated messages provided by coaches in previous conversations, but can additionally or alternatively include any other messages from any suitable users.

Additionally or alternatively, the corpus of messages can include automatically generated messages (e.g., which were selected and provided by coaches in previous conversations) and/or any other messages. The corpus of messages can optionally be any or all of: de-identified (e.g., edited to remove names and/or locations and/or personal details prior to inclusion in the corpus of messages), edited (e.g., to correct spelling and/or grammatical errors), unedited, and/or any combination.

Further additionally or alternatively, any number of inclusion criteria can be applied for inclusion of messages in the corpus, which can function to: ensure quality of the messages (e.g., for instances in which messages from the corpus are directly provided as an option to coaches); ensure relevance of the messages; prevent messages which are irregular and/or inappropriate and/or irrelevant from being provided to the coaches; and/or can perform any other functions.

In some variations, for instance, certain heuristics can be applied to messages which are included in the corpus, such as verifying that each message has appeared in at least a predetermined number of conversations over time (e.g., at least 2, at least 3, etc.), which can serve as a proxy for quality and/or relevance of the message (e.g., preventing messages with typographical errors from being included, preventing messages with proper nouns from being included, preventing messages which are highly specific and/or personal to a particular user from being included, etc.). This can in turn function to prevent the need for messages to be verified (e.g., by humans) or otherwise processed prior to inclusion. Additionally or alternatively, any other inclusion criteria (e.g., requirement that each message was used multiple times by different coaches) can be applied.

Additionally or alternatively, any other inputs can be received in S100.

4.2 Method—Determining a Set of Response Options Based on the Set of Inputs S200.

The method 200 preferably includes determining a set of response options based on the set of inputs S200, which functions to provide a set of automated response options (e.g., message predictions, message options, etc.) to a user. Additionally or alternatively, S200 can function to: determine a single prediction to be automatically inserted into a message thread; prevent redundant or nearly redundant response options from being provided to a user; and/or can perform any other functions.

S200 is preferably performed in response to and based on the set of inputs received in S100 (e.g., one or more times in response to each query received), but can additionally or alternatively be performed at any other time(s). In variants, S200 can be performed by a local device (e.g., on a user's device), by a remote computing system (e.g., cloud computing system), and/or otherwise performed.

S200 can optionally include pre-processing any or all of the set of inputs, which can function to: prepare the inputs for further processing; enable comparisons to be made among the set of inputs (e.g., determine which messages are semantically the closest, determine which messages are semantically related, determined which messages are effectively equivalent, etc.); and/or be used for any other purpose(s).

Figure 3:
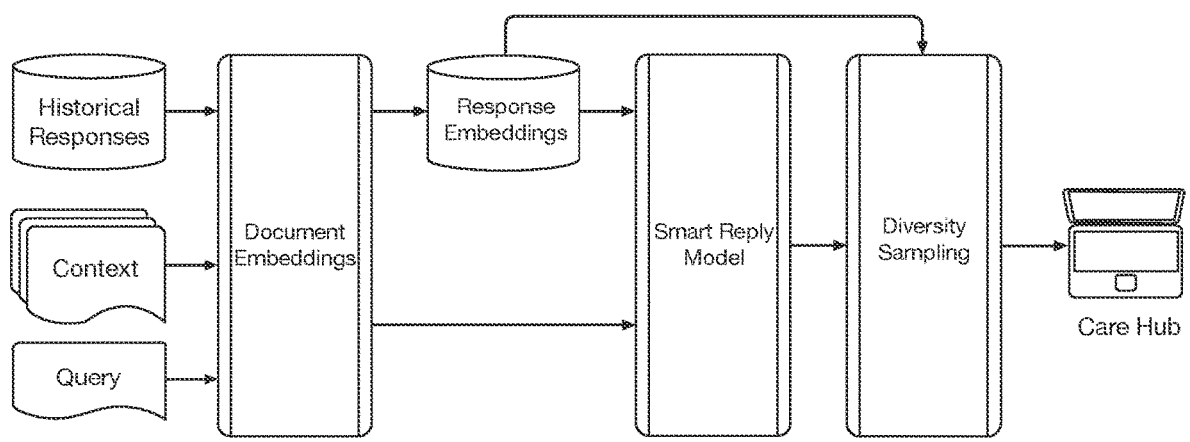
FIG. 3 depicts a schematic variation of a method for automatically determining responses in a messaging platform.

In a preferred set of variations (e.g., as shown in FIG. 3), pre-processing the set of inputs includes generating a set of embeddings for any or all of the set of inputs, wherein the embeddings function to represent each of the set of inputs (e.g., each message) with a numerical array (e.g., vector, matrix, etc.) which quantifies the message. The embedding pre-processing can be performed by the embedding model and/or by other models. In examples, the embedding pre-processing can be performed with a natural language model (e.g., for multiple languages), with a machine learning (e.g., deep learning) natural language embeddings model, and/or with any other models, algorithms, and/or tools.

Pre-processing the set of inputs can additionally or alternatively include non-embedding pre-processing such as: correcting spelling and/or grammar errors contained in the inputs, de-identifying user data (e.g., removing PII), generalizing the inputs, threat detection, and/or any other processes. Preferably, non-embedding pre-processing occurs prior to generating the set of embeddings, but can additionally or alternatively occur after generating the set of embeddings, or after generating the set of response options. In examples, threat detection can include analyzing inputs for specific sets of words to detect any perceived threats to the safety of the user and/or others. Optionally, a detected threat can trigger an alert to the care team, or trigger other de-escalation processes. In an example, the method can incorporate any of the methods for threat detection and/or escalation as described in U.S. patent application Ser. No. 17/752,097 filed 24 May 2022, which is incorporated herein in its entirety by this reference.

In specific examples, S200 includes determining embeddings for each of: the query message, each of the context messages, and each of the historical response messages (e.g., example shown in FIG. 1*i*).

However, pre-processing inputs can be otherwise performed.

S200 preferably includes processing the set of inputs and/or the pre-processed set of inputs, which functions to determine (e.g., generate, retrieve, prioritize, etc.) a set of messages which can be proposed to a user for inclusion in a message thread.

The set of inputs (e.g., message embeddings) are preferably processed with one or more models (e.g., smart reply model, example shown in FIG. 3, etc.), and further preferably with one or more machine learning models. In a preferred set of variations, the processing is performed with a deep learning model (e.g., feed forward neural network, recurrent neural network, convolutional neural network, etc.). Additionally or alternatively, any other models (e.g., machine learning models, rule-based models, etc.), algorithms, decision trees, lookup tables, and/or other tools or combination of tools can be used.

The processing preferably produces as output an ordered list of automated response options (e.g., candidate set of response options, message predictions, message options, etc.), wherein the order indicates which automated responses the set of models has indicated would be the most likely to be used (e.g., by a coach manually writing a response) within the current conversation. This can, in turn, optionally serve as a proxy for the most recommended responses being ordered at the top of the list. Additionally or alternatively, outputs of the processing can include any or all of: a single automated response (e.g., from the top of the list), a predetermined number of automated responses (e.g., top 2, top 3, top 4, etc.), all automated response options having a parameter (e.g., similarity parameter, closeness value, etc.) greater than a threshold, non-automated-response outputs, and/or any other outputs or combination of outputs. Additionally or alternatively, outputs of the processing can include an unordered set of response options and ranking and/or probability for each response option.

In a preferred set of variations, the automated response options include responses directly from the corpus of historical responses (e.g., manually generated responses, previously automatically-recommended responses, etc.). Additionally or alternatively, the automated response options can include responses which were automatically generated (e.g., on a word-by-word basis, on a phrase-by-phrase basis, etc.), responses from outside the corpus, and/or any other responses.

In a first variant, the response options for a user are generated from a corpus of historical responses of many users (e.g., all types of users, users of the same user class, etc.).

In a second variant, the response options for a user are generated from a corpus of historical responses sent by the user.

In a third variant, one or more of the response options for a user are generated from a corpus of historical responses sent by the user, and supplemented by a corpus of historical response options sent by other users (e.g., other users of the same user class).

In a fourth variant, one or more of the response options is generated by the smart reply model (e.g., on a word-by-word basis, on a sentence-by-sentence basis, etc.), rather than being drawn from a corpus. In an example, the smart reply model outputs a set of response embeddings, and converts the response embeddings into text.

In a fifth variant, one or more response options is drawn from a template, rather than a corpus of historical responses.

However, processing inputs can be otherwise performed.

S200 can optionally include post-processing the set of outputs, which functions to select and/or refine which options (e.g., presented response options, message predictions, message options, etc.) are transmitted to a recipient (e.g., in S300) and/or populated in a message thread.

In a preferred set of variations, for instance, post-processing the set of outputs includes selecting a predetermined number of automated response options to be provided to a recipient in S300. In specific examples, between 2 and 5 of the most relevant/most recommended (e.g., highest in the ranked list) response options (e.g., top 3) are presented to the user in S300. Additionally or alternatively, any other number of response options (e.g., single response option, greater than 5 response options, all response options in the ranked list, all response options meeting a specific criterion, etc.) can be provided to the user in S300.

Additionally or alternatively, post-processing the set of outputs includes a diversity sampling process, which functions to ensure that the automated response options provided to the user in S300 are not redundant and/or mostly redundant with respect to each other. This could cause, for instance, the recipient to not have true variety in which response they select, which could, in turn, lead to collapsing of conversations with members to a small subset of topics (e.g., which could lead to member dissatisfaction with their coaching). In variants, a diversity sampling process can be performed by the diversity sampling module. In an example, the diversity sampling process includes determining a set of response options (e.g., unique response option set, presented response option set, etc.) from the ranked list of response options (e.g., from the response option set, from the candidate set of response options, etc.), wherein each response option in the set of response options meets or exceeds a threshold dissimilarity score with the other members of the set.

Figure 4:
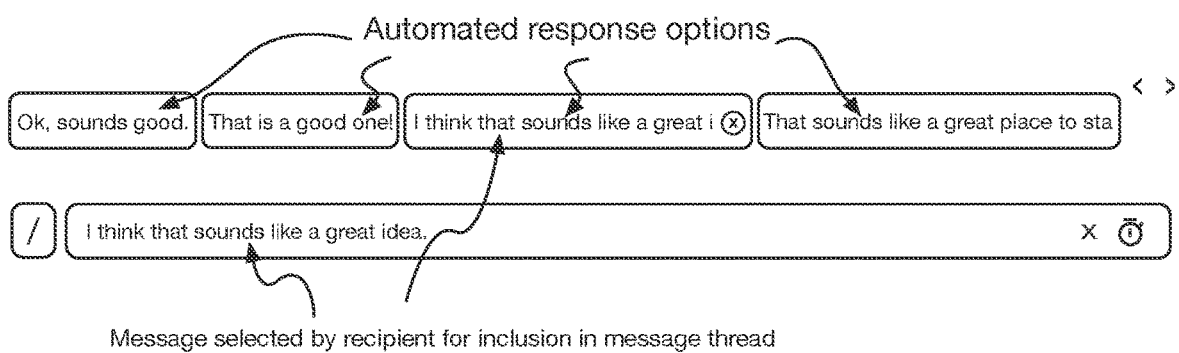
FIG. 4 depicts an example of any or all of a method for automatically determining responses in a messaging platform.
Figure 4:
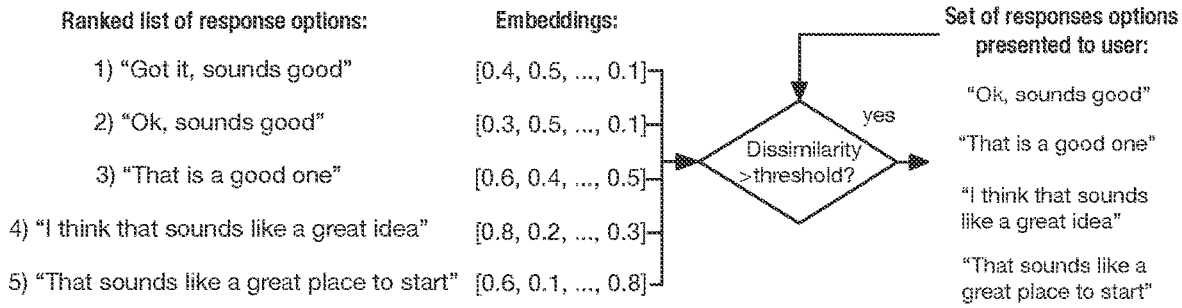

In a preferred set of variations, for instance, a diversity sampling process is applied which checks to see if multiple response options from the ranked list (and/or a refined number of response options) are too similar to each other (e.g., non-unique). Determining this similarity is preferably performed by comparing the embeddings corresponding to each response option with each other, wherein if a "distance" between embeddings (e.g., based on a mathematical operation) is below a threshold, the response options are deemed to be too similar. In such an event, the method preferably includes removing all but one of the similar responses and replacing those which have been removed with the next response options from the ranked list (e.g., as shown in FIG. 4). This can optionally be repeated until a predetermined number of diverse responses (e.g., unique responses) are present. In eliminating a similar response option, this can optionally be done randomly and/or in an alternating fashion such that the same response option does not always remain, thereby preventing the recipient from always being presented with the same options and/or from repeating the same exact phrase multiple times in a conversation.

Additionally or alternatively, any or all of the response options could be refined based on other information, such as, but not limited to: other messages already provided in the message thread (e.g., wherein a response option is filtered out if the recipient has already said that phrase or something similar), user preferences (e.g., such that response options match a tone and/or style of the recipient, such that response options match a tone and/or style of a coach and/or coaching session rated highly by the recipient, etc.), personalization (e.g., slot filling), and/or any other information.

Additionally or alternatively, S200 can include any other processes.

4.3 Method—Providing the Set of Response Options to a User S300.

The method 200 can optionally include providing the set of response options to a user S300, which functions to enable the user to provide an automated response in the corresponding message thread. Response options (e.g., presented response options, message options, message predictions, etc.) can be provided on a display in the hub or messaging platform. The response options can be provided above, below, next to, inside of, adjacent, distal, or otherwise positioned relative to the chat message input section. Response options can autocomplete a partial message entered by the user, be presented as selectable response options, or be otherwise presented. Response options can be provided in full or in an abbreviated form (e.g., wherein the first portion of the response option is displayed, and the full response option is expanded and displayed if a user clicks on that option). Response options can be provided side by side, in a scroll menu, as a list, in. drop-down menu, and/or in any other format.

S300 is preferably performed in response to S200, but can additionally or alternatively be performed in response to a trigger (e.g., request from the user) and/or at any other times.

In a preferred set of variations, S300 includes presenting a set of automated response options at a user interface (e.g., coach dashboard, within messaging thread of coach dashboard, etc.), such that the user can simply select an option and it will be inserted into the message thread (e.g., as shown in FIG. 4). In specific examples, the response options could further be able to be combined (e.g., stacked on top of each other, multiple sentences combined into a single response, etc.). In a particular specific example, for instance, S200 can be performed on each sentence and/or on each of a set of multiple messages, wherein automated responses corresponding to each sentence and/or each message can be provided and aggregated by the recipient.

Additionally or alternatively, S300 can include presenting the user with the set of response options, receiving a selection of a response option, and inserting the selected response option into a text editor. The user can optionally further edit the selected response option prior to sending the message to the recipient. Optionally, S300 can offer the user an option to decline an automated response option, and the user can draft an alternative message. The resultant message (e.g., editing automated response option, user generated message, etc.) sent by the user can optionally be added to the corpus, used to train the smart reply model, and/or otherwise used.

Alternatively, a message can be automatically selected and/or inserted, and/or the user can otherwise interface with the response options.

Additionally or alternatively, S30 can include providing categories of response options. Categories can include: questions (e.g., for interest, clarification, follow-up question, leading question, etc.), expressing empathy and/or interest, feedback, guidance, prescriptive information, and/or any other categories. Providing a category to a user is preferably performed before generating the set of response options, but can additionally or alternatively be performed after generating the set of response options.

Additionally or alternatively, S300 can include any other suitable processes.

4.4 Method—Optional Processes.

The method 200 can additionally or alternatively include any number of other processes performed in any suitable order.

Figure 5:
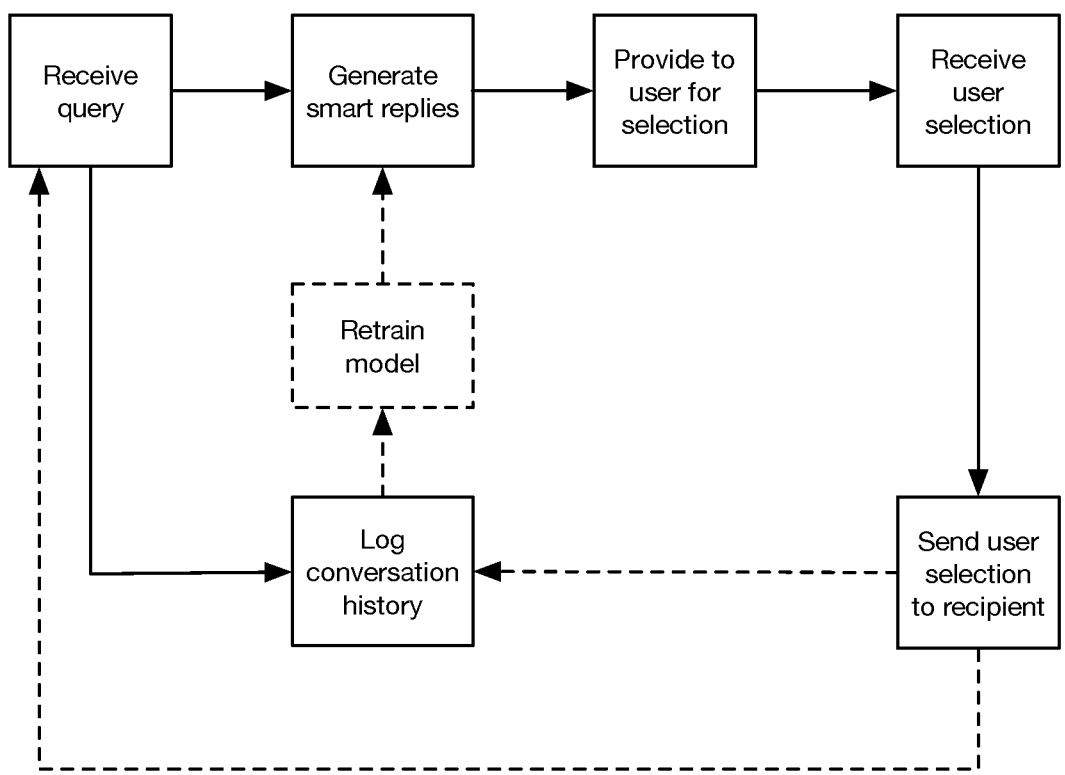
FIG. 5 depicts an example of any or all of a method for automatically determining responses in a messaging platform.

In some variations, for instance, the method 200 includes any or all of: receiving a selection of one of the auto-generated response options from the user, sending the selection as a message (e.g., in the messaging platform, external to the messaging platform), training any or all of a set of models and/or algorithms (e.g., training the smart reply model, training the embeddings determination model, training the diversity sampling model, etc.); updating (e.g., retraining) any or all of the set of models (e.g., based on which responses are selected by the user); updating the corpus of messages (e.g., to include selected response options, to include additional manually generated responses, etc.); and/or any other processes. Examples are shown in FIG. 5.

In a set of examples, for instance, the method 200 includes training the smart reply through a batch training framework, wherein in each batch and for each (context, query) pair, a message and/or ranked set of messages is predicted by the model, and if the predicted outputs were not similar to the actual provided response, the model is penalized.

Updating the corpus of messages can be performed continuously, in response to a trigger, and/or otherwise performed. A general corpus of historical responses can be updated, and/or a specific corpus (e.g., specific to a user, user class, etc.) can be updated. In a first variant, updating the corpus is performed in response to each receipt of a message in the messaging platform. Every message sent in the messaging platform is automatically added to the corpus. In a second variant, every time a conversation is finished, the thread is added to the corpus. In a third variant, a frequency analysis and/or criterion is applied to determine when to add a message to the corpus. Any or all conversations held in the messaging platform can be stored, and a message is added to the corpus once the message has been sent at least a threshold number of times. Optionally, the responses of coaches can be weighted (e.g., based on a success rate of the coach, a review score of the coach, the newness of the coach, a user satisfaction response after a conversation, etc.). In a fourth variant, each time a message and/or conversation receives a positive response, the message and/or messages of the conversation can be added to the corpus. A positive response can be evaluated using a sentiment model, a survey, and/or any other means. However, updating the corpus can be otherwise performed.

Additionally or alternatively, the method 200 can include any other suitable processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising:
   generating a query embedding of a query message from a conversation thread;
   generating a set of context embeddings of a set of prior messages in the conversation thread;
   with a trained model, determining a ranked list of response options for the query message based on the query embedding and the set of context embeddings;
   determining a set of response options from the ranked list of response options, wherein each response option of the set of response options is distinct from each of the other members of the set, wherein determining the set of response options comprises determining that two members of the ranked list of response options do not have at least a predetermined threshold dissimilarity from one another, and selecting only one of the two members to add to the set of response options; and
   providing the set of response options, determined from the ranked list of response options, wherein each response option in the set of response options has at least the predetermined threshold dissimilarity from each of the other members of the set.

2. The method of claim 1, wherein determining the set of response options further comprises randomly selecting a predefined number of the top unique response options from the ranked list.

3. The method of claim 1, wherein the response options are determined from a corpus of historical messages sent by a plurality of users.

4. The method of claim 1, wherein each response option is associated with a response embedding.

5. The method of claim 4, further comprising determining a distance between the respective response embeddings for response option in the ranked list, wherein the predetermined threshold dissimilarity comprises a minimum distance between response options.

6. The method of claim 4, wherein the query embedding, the set of context embeddings, and the response embeddings are determined using a shared message-to-embedding model.

7. The method of claim 4, wherein the query embedding, the set of context embeddings, and the response embeddings are semantic embeddings.

8. The method of claim 4, wherein the trained model determines the ranked list of response options based on the respective response embeddings for each response option.

9. The method of claim 1, wherein the method is repeated for each message sent in the conversation thread, wherein a last message in the conversation thread is treated as the query message.

10. The method of claim 1, further comprising inserting personalized information into a response option.

11. The method of claim 1, further comprising:
    receiving a response selection from the set of response options from the user;
    sending the selected response to a recipient; and
    storing the selected response in a corpus of historical messages sent by a plurality of users, wherein the response options are determined from the corpus of historical messages.

12. The method of claim 1, wherein the embeddings are generated using an embedding model, wherein the embedding model is a trained machine learning model.

13. A system for providing automatic message suggestions comprising:
    a messaging platform that receives and transmits messages between users;
    a query embedding model that determines a query embedding for a last message in a conversation thread;
    a context embedding model that determines a set of context embeddings of a set of previously sent messages from the conversation thread;
    a smart reply model that determines a ranked list of response options based on the query embedding and the set of context embeddings; and
    a diversity sampling model that selects a set of response options from the ranked list, wherein each response option in the set of response options meets or exceeds a predetermined threshold dissimilarity from each of the other members of the set, wherein selecting the set of response options comprises determining that two members of the ranked list of response options do not have at least a predetermined threshold dissimilarity from one another, and selecting only one of the two members to add to the set of response options.

14. The system of claim 13, wherein at least two response options in the ranked list of response options do not meet or exceed the threshold dissimilarity score with one another.

15. The system of claim 13, wherein each response option is associated with a response embedding, wherein the diversity sampling model is further configured to select the set of response options from the ranked list based on an embedding distance between closely-embedded response options in the list.

16. The system of claim 15, wherein the diversity sampling model is configured to select the set of response options from the ranked list based on the embedding distance between closely-embedded response options in the list by randomly selecting a response option from closely-embedded response options in the ranked list.

17. The system of claim 13, wherein the smart reply model is trained to predict the ranked list using a training data set comprising a set of training responses, each associated with a training query embedding and a training context embedding set, wherein the smart reply model is trained based on a similarity between the training response and a top response in a response list predicted by the smart reply model given a training query embedding and a training context embedding set.

18. The system of claim 13, wherein the ranked list of response options comprises embeddings of response options.

19. The system of claim 13, further comprising a corpus of historical messages sent by a plurality of users, wherein the response options are retrieved from the corpus.

20. The system of claim 19, wherein a set of historical messages sent by a user are stored in association with the user in the corpus, wherein the response options are retrieved from the set of historical messages sent by the user and provided to the user.

\* \* \* \* \*